(12) United States Patent
Kelly et al.

(10) Patent No.: US 7,592,094 B2
(45) Date of Patent: Sep. 22, 2009

(54) DEVICE, SYSTEM AND METHOD FOR IMPROVING EFFICIENCY AND PREVENTING DEGRADATION OF ENERGY STORAGE DEVICES

(76) Inventors: Shawn P. Kelly, 47 Kaatskill Way, Ballston Spa, NY (US) 12020; Joseph R. Galgana, 270 Old Ocean St., Marshfield, MA (US) 02050

( * ) Notice: Subject to any disclaimer, the term of this patent is extended or adjusted under 35 U.S.C. 154(b) by 910 days.

(21) Appl. No.: 10/543,296

(22) PCT Filed: Jan. 30, 2004

(86) PCT No.: PCT/US2004/002663

§ 371 (c)(1),
(2), (4) Date: Jul. 26, 2005

(87) PCT Pub. No.: WO2004/070857

PCT Pub. Date: Aug. 19, 2004

(65) Prior Publication Data

US 2006/0051659 A1   Mar. 9, 2006

Related U.S. Application Data

(60) Provisional application No. 60/319,921, filed on Feb. 3, 2003.

(51) Int. Cl.
*H01M 6/50*   (2006.01)
*H01M 10/42*   (2006.01)
*H01M 10/44*   (2006.01)

(52) U.S. Cl. .............................. 429/49; 429/48; 429/50; 429/52

(58) Field of Classification Search .............. 429/48–50, 429/52
See application file for complete search history.

(56) References Cited

U.S. PATENT DOCUMENTS

| | | | |
|---|---|---|---|
| 3,923,550 A | 12/1975 | von Krusenstierna | |
| 4,587,182 A | 5/1986 | Stiles et al. | |
| 5,276,393 A | 1/1994 | Gali | |
| 5,352,544 A | 10/1994 | Kumar et al. | |
| 5,491,399 A | 2/1996 | Gregory et al. | |
| 5,525,892 A | 6/1996 | Phommarath | |
| 5,541,495 A | 7/1996 | Gali | |
| 5,614,332 A | 3/1997 | Pavelle et al. | |
| 5,677,612 A | 10/1997 | Campagnuolo et al. | |
| 5,808,447 A | 9/1998 | Hagino | |
| 5,872,443 A | 2/1999 | Williamson | |
| 5,891,590 A | 4/1999 | King | |
| 5,932,991 A | 8/1999 | Ahuja et al. | |
| 5,945,236 A | 8/1999 | Willis | |
| 5,963,008 A | 10/1999 | Cordeiro et al. | |
| 6,040,680 A | 3/2000 | Toya et al. | |
| 6,060,198 A | 5/2000 | Snaper | |
| 6,130,522 A | 10/2000 | Makar | |
| 6,184,650 B1 | 2/2001 | Gelbman | |
| 6,299,998 B1 | 10/2001 | Morris et al. | |
| 6,337,465 B1 | 1/2002 | Masters et al. | |
| 6,451,485 B1 | 9/2002 | James et al. | |
| 6,458,480 B1 | 10/2002 | Morris et al. | |
| 6,458,489 B1 | 10/2002 | Alzieu et al. | |

*Primary Examiner*—Patrick Ryan
*Assistant Examiner*—Muhammad Siddiquee
(74) *Attorney, Agent, or Firm*—Jay R. Yablon

(57) ABSTRACT

Disclosed herein is a method and related device for improving energy performance and substantially preventing degradation of a chemical-to-electrical energy conversion process of an energy storage device (10), comprising the steps of: mechanically exciting chemical reaction products within the energy storage device (10) at energy levels proximate which covalent bonds with a matrix (51) of the energy storage device (10) would form absent excitation, thereby substantially maintaining ionic bonding between the chemical reaction products and the matrix (51) and substantially preventing the chemical reaction products from covalently bonding with the matrix (51); and introducing the mechanical excitations into the energy storage device (10) via an active material (31) mechanically-responsive to electromagnetic signals, in response to an electromagnetic signal.

280 Claims, 4 Drawing Sheets

DEVICE, SYSTEM AND METHOD FOR IMPROVING EFFICIENCY AND PREVENTING DEGRADATION OF ENERGY STORAGE DEVICES

FIELD OF THE INVENTION

This invention pertains generally to improving the electrical performance of energy storage devices, and in particular to improving the efficiency and preventing electrode degradation of an energy storage device.

BACKGROUND OF THE INVENTION

The lead (Pb) and lead dioxide ($PbO_2$) material used for lead-acid battery electrodes (hereinafter the "matrix") are very porous materials. This porosity allows the electrolyte completely to penetrate the matrix and chemically react within it. This in turn increases the current-carrying capacity of the battery. Without these pores the battery's load carrying ability would suffer greatly. Unfortunately, nothing is gained without giving something up. FIG. 1 illustrates a "like-new, porous electrode" which has not been in contact with electrolyte. FIG. 2 illustrates a similar electrode after six months of use. While lead-acid batteries will be used here for illustrative purposes, analogous considerations apply generally to other chemical-to-electrical energy storage devices employing alternative electrode and electrolytic materials.

When a lead-acid battery discharges, $PbSO_4$'s form within the pores and on the surface of the matrix. The formation of $PbSO_4$'s on the surface of the matrix does not present a real problem; these sulfates ($SO_4$'s) go into solution easily during the charge cycle. It is the formation of $PbSO_4$'s within the matrix that deteriorates the battery's capacity over time. After several charge and discharge cycles these $PbSO_4$'s build up within the pores. The strength of the bonds created between Pb and $SO_4$ have several different levels. The longer these two molecules remain in contact the stronger the bonds become. If every $SO_4$ is not driven back into solution during the charging process, the remaining $PbSO_4$ bonds grow stronger and stronger, dropping to lower and lower covalent energy levels. At this point the amount of time and current required to break these bonds will have to be increased, and the collateral damage to the battery resulting from such removal increases significantly.

Eventually these stubborn $PbSO_4$ formations will crystallize (sulfation) and block passage of the electrolyte through the matrix. Sulfation lowers the current-carrying capacity and over time limits the energy storage capacity of the battery. It also diminishes the life of the battery and can cause structural damage. It is this limitation that requires users to apply voltages much higher than that of the battery itself in order to recharge it, and that results in batteries being made larger then they would otherwise need to be to store and deliver a given quantity of energy.

The sulfate ion has several different energy-bonding states or energy levels. Over time, there is a transition—a drop in energy level—from a less-stable ionic bond to a very-stable covalent bond. These molecules stack up like shingles to cover the surface of and the porous regions throughout the matrix. The effect is like painting the battery plate with a resistive coating. The useful life of a lead-acid battery is dictated by the ability to break up these deposits.

Early attempts to eliminate lead-acid sulfation began with equalization or "over charging." This process was successful at removing most of the deposits, but at a very high cost to the battery life span, due to the erosion of the positive plate grid structure. The process, being highly exothermic, results in heat generation, plate warpage and mechanical stress on cell components. There are numerous examples of battery cells exploding as a result of equalization. Later a safer electronic charging process was developed. This improved technique is still unable to remove the oldest and most stable sulfate deposits from the plates. This process still relies on large voltages, and therefore currents, when the charge is applied. Thus, this process also results in the adverse factors mentioned above, and wastes energy. In addition, this process of charging is very time-consuming.

Some efforts to address sulfation focus on improved chemical constituents, for example, U.S. Pat. No. 5,945,236 for an electrolyte additive and U.S. Pat. No. 6,458,489 which alters the concentration of $H_2SO_4$ in a lead acid battery.

Many attempts have been made to use large pulsating currents to reduce sulfation and similar deposits. For example:

U.S. Pat. No. 5,491,399 discloses "a fast rise time current pulse for application to a battery" (abstract), which, based on FIGS. 2 and 3, appears to be on the order of a few μsec, which translates to a 500 KHz frequency. This—like virtually all the prior art—is used for "removing the lead sulfate deposits from the battery plates" (column 1, lines 37-38).

U.S. Pat. No. 5,525,892 discloses using "a positive voltage pulse train (characterized by a fast rise time spike followed by a non-uniform hump-shaped trail-off) that is combined with a DC charging current output by the charger" (abstract). "[T]he shape of the trail-off of each pulse is not uniform from pulse to pulse in the pulse train. This fluctuation in the shape characteristics of the pulses within the pulse train is believed to result in improved sulfate deposit removal" (column 1, lines 47-48). "The rise time 208 for the spike portions 204 of the pulses 202 generated by the pulsed battery rejuvenator 10 is approximately four to eight microseconds per pulse" (column 3, lines 55-58), translating to a frequency from about 125 to 250 KHz.

U.S. Pat. No. 5,677,612 discloses that a "battery desulfator operates by taking a small amount of energy from the battery 124, which passes through the oscillator or multivibrator 125, which in turn transforms the battery DC voltage into high frequency pulses which are fed back into the battery 124" (column 2, lines 17-21). While no frequencies are specifically disclosed, it is noted that the "process continues at a rate of several thousand times per second" (column 3, lines 25-26).

U.S. Pat. No. 5,808,447 discloses "pulse charging [which] charges a rechargeable battery by repeatedly alternating periods of charging and suspension of charging" (column 2, lines 30-32). The "400 msec" interval mentioned in column 6, line 6 and elsewhere is suggestive of an approximate 2.5 KHz frequency.

U.S. Pat. No. 6,130,522 discloses "connecting a current source device across the positive and negative terminals of the battery and applying a periodic pulse to the device so as to apply a pulsed current across the battery terminals without applying a voltage pulse" (abstract). "The pulse frequency is selectable over a wide range but preferably is greater than the frequency of the base charger current so that it preferably ranges from 60 Hz to 100,000 Hz" (column 4, lines 55-58).

U.S. Pat. No. 5,891,590 discloses "[a] device and method for reducing crystal formations, which have a range of resonant frequencies, on electrode plates of an electrical battery . . . [using] a train of direct current pulses at a frequency within the range of resonant frequencies . . . " (abstract). It appears that the "resonant frequencies" referred to something other than chemical bonding resonances, because "[t]he frequency is selected to fall within a range of frequencies that is believed to correspond to the range of resonant frequencies of the lead sulfate crystals. Preferably, the range is in the order of about 10 KHz to 32 KHz and more preferably in a range of about 20 KHz to 32 KHz" (column 4, lines 5-9). The resonant frequency of chemical bonds connecting Pb to $SO_4$ in $PbSO_4$ is in fact on the order of 3.26 MHz at the lowest covalent bonding energy—over 100 times as high as the frequencies discussed here—so it is clear that these chemical bonds are not at all under consideration in U.S. Pat. No. 5,891,590.

Among many other problems, all of U.S. Pat. Nos. 5,491, 399; 5,525,892; 5,677,612; 5,808,447; 6,130,522; and 5,891, 590 employ frequencies in the sub-500 KHz range, and such low frequencies are insufficient to get at the root cause of lead-acid battery sulfation—namely—the covalent chemical bonds which form between Pb to $SO_4$ in $PbSO_4$, or to address similar plating phenomena in other types of batteries.

U.S. Pat. No. 5,276,393 discloses "[a] solar powered battery reclaiming and charging circuit . . . having a high frequency section . . . and output coupled by a close coupled RF transformer to the battery connected output section. The transformer has a secondary winding producing a current-voltage full wave output sharply defined through a two diode rectifying circuit to a multi-frequency 10 KHz to 100 KHz pulse output. The sharp pulse outputs with RF content in the 2-10 megahertz frequency range have specific frequencies equal to natural resonant frequencies of the specific electrolytes used in respective batteries. These resulting high frequency RF output signals in each pulse envelope structure are capable of reclaiming, maintaining and charging batteries that possess a liquid electrolyte or jell electrolyte and are beneficial to dry cell batteries as well in extending battery life" (abstract, see also column 1, lines 48-68). This patent thus focuses on the resonant frequencies of the "specific electrolytes" under consideration.

U.S. Pat. No. 6,184,650 observes that "[i]t is possible to reverse [i.e., remove, not prevent] the build-up of sulfur crystals on the collectors (plates) of a lead-acid type storage battery. By 'hitting' these plates with electrical pulses which produce energy at 3.26 MHz, which is the resonant frequency of a sulfur crystal, the bond is broken, allowing the molecules to dissolve back into the electrolyte solution from which they first came" (column 1, lines 8-15). It is further stated that "[t]his invention is capable of reversing the build-up of crystallized sulfur on the 'plates' of a lead-acid storage battery, thereby improving the charge/discharge characteristics of a battery in which such formations have occurred. It accomplishes this process by rapidly turning the charger on and off (rise time=200-500 nsec.) and by generating pulses (1 Amp amplitude) during the 'float' charge cycle" (column 1, lines 25-32).

These two patents, U.S. Pat. Nos. 5,276,393 and 6,184, 650, provide a more satisfactory frequency range for addressing sulfation. However, they still rely on pulsed electrical stimulation of the battery, which itself wastes energy and damages the battery. This process of periodically sending large voltage spikes into the battery may have desirable short-term effects, but the long-term effects are detrimental to the battery performance and should be avoided. A sharp electrical pulse at such high frequency to remove sulfate deposits which have already formed is akin to attacking the matrix with a jackhammer: the deposits may be removed, but the matrix itself is also damaged in the process.

Although an electrical pulse may contain frequency components required to resonate the crystal's structure, these pulses also contain other frequency components which serve no useful purpose in the minimization of sulfation and therefore improved battery performance. These extra frequency components contain energy and this energy is being wasted unnecessarily. The process of injecting pulsed electrical energy into a covalent bond to create a mechanical response is highly inefficient. This electromagnetic-to-mechanical conversion process is similar to that of a microwave oven. The radiation in a microwave oven is used to mechanically excite the water molecule bonds present in the material. It is well known that the energy required to heat a glass of water from room temperature to the boiling point is much greater than the energy the glass of water actually received. This excess energy is wasted and if there were a more efficient way to inject the energy into the mechanical type bonds of water the microwave would be much more efficient device.

These patents which rely on electrical stimulation are not concerned with this wasted energy. In addition, the large voltages contained within the pulse are applied across water molecules and through electrolysis, so more gassing is likely. This is also a form of wasted energy. Although some gassing is essential to battery performance, too much gassing is detrimental to battery life. Therefore, in achieving its objective, all of these patents which employ electrical stimulation to remove sulfates after they are already formed not only waste valuable energy but also degrade the life of the storage device. If a method could be found that eliminates the need for these high voltages and currents, the wasted energy and the degradation of a storage device could be eliminated. In other words, the performance characteristics of an energy storage device can be improved. Since these patents are not concerned with the amount of energy used to achieve its goal, they shift their focus from energy storage to sulfate minimization and have effectively defeated the underlying foundation of a battery—efficient energy storage.

U.S. Pat. No. 5,872,443 discloses "[a]n electronic method . . . whereby the applied electromotive force optimizes the electrokinetic behavior of charged particles to match closely the natural electrical response and physical structure of the system. The method shapes the electromotive force's amplitude and frequency to normalize the relative interactions between the charged particles and the physical structure." While interesting as general background, the application of an electromotive force in this patent still poses the same problems as in the aforementioned patents.

A fair number of other patents take a mechanical, rather than electrical approach. For example:

U.S. Pat. Nos. 6,299,998 and 6,458,480 disclose batteries with movable anodes, and U.S. Pat. No. 4,587,182 discloses the use of a "compressive load on the anode which inhibits the formation of a porous deposit of exterior, irregularly oriented, amalgamated lithium grains on the anode" (abstract).

U.S. Pat. No. 3,923,550 discloses that "to avoid dendrite formation when charging an alkaline accumulator battery cell having a zinc anode . . . either the separator or the anode is subjected to a vibratory movement during the charging process" (abstract). "The vibratory movement is suitable carried out with a frequency of 0.01-1000 Hz, preferably 1-500 Hz" (column 2, lines 19-20).

U.S. Pat. No. 5,352,544 discloses "a method for increasing the ionic conductivity of solid polymer electrolytes which comprises mechanically exciting the units which comprise the polymer electrolytes [and] a . . . solid state battery having a solid polymer electrolyte and means for mechanically exciting the polymer electrolyte" (column 2, lines 14-22). In particular, this patent employs "mechanical excitation over a frequency range of 40-400 KHz" (column 3, lines 27-28 and elsewhere).

U.S. Pat. No. 5,932,991 discloses "enhancing the charging of a battery by exposing the battery to acoustic excitation while the battery is being charged" (abstract) and specifically the use of a 20 KHz. frequency (column 3, line 52, and several other places).

U.S. Pat. No. 6,060,198 employs a transducer. "The ultrasonic frequency to be selected and its intensity are functions of the structural characteristics of the entire battery. Usually the frequency range will be between about 20 KHz and about 120 KHz. The required wattage is surprisingly low. Typically between about 10 to about 20 watts output of vibrational energy will be sufficient." (column 5, lines 31-36). This is a good example of mechanically-based approaches where the frequency and/or pulse rise time is determined by reference to the physical, structural elements of the battery.

U.S. Pat. No. 5,963,008, in a similar vein, discloses that "[e]lectroacoustic battery sonication rehabilitates a battery by decreasing metallic shorting across battery elements through sonication. Sonication may be produced by application of an electrical signal [damaging to the battery as earlier discussed] of selected frequency to the terminals of a battery, thereby establishing a resonant condition within the battery. Alternately, sonication may be provided by transducers placed within a battery and receiving a drive signal of selected frequency to establish a resonant condition within the battery" (abstract). More specifically, it is disclosed that "an appropriate resonant frequency for sonication in a lead acid battery may be approximated under these calculations and, in general, a 200-300 kilohertz frequency is productive. A lower frequency may work to some degree, but will be of lesser effect. Higher frequencies, however, produce vibration of smaller portions of a given body. The nature and shape of the battery elements to be vibrated drives frequency selection to the range suggested herein. A typical lead acid battery grid consists of squares, or a similar shape, of approximately 0.01 m. This characteristic of typical lead acid batteries provided a basis for selecting a 0.01 m wavelength in the above calculations. Other battery configurations would likely exhibit different resonant characteristics and would possibly require different sonication signal frequencies" (column 4, lines 37-51).

The "above calculations" for selecting the "sonication" frequency are set forth in the formulae in column 4, lines 25-34. The frequencies are selected based on the speed of sound in the electrode grid and the size of the typical grid elements, i.e., squares, according to FREQUENCY=VELOCITY OF SOUND IN THE GRID/SIZE OF GRID ELEMENT. According to this approach, using the unbounded lead calculation, one would not employ a frequency as high as 1 MHz unless and until the grid element size reached approximately 2.5 mm, which is very small.

U.S. Pat. No. 5,614,332 is very similar to U.S. Pat. No. 5,963,008 (and U.S. Pat. No. 6,060,198) in its underlying theory of how to select an appropriate frequency for mechanical stimulation. It too discloses a battery in which "electrodes are connected to a charging or discharging circuit and at least one electrode is mechanically manipulated during the charging or discharging" (abstract). "The preferred frequency is on the order of 50 KHz for a battery electrode of characteristic length 10 cm . . . . The frequency scales inversely with the battery electrode size. Thus, a 100 cm long battery electrode would require a 5 KHz minimum frequency" (column 6, lines 9-12). Although "FIG. 13 shows an ultrasonic transducer 132 . . . which can operate at frequencies as high as 2 MHz," which is still substantially less than, say, the 3.26 MHz frequency of $PbSO_4$, it is clear that such a high frequency—based on the inverse frequency scaling disclosure of this patent later given more precise definition in U.S. Pat. No. 5,963,008—would be employed for a (50 KHz/2000 KHz)× 10 cm=2.5 mm long battery electrode, that is, for a microbattery cell.

This is the same sort of result reached in U.S. Pat. No. 5,963,008, namely, that high frequencies in the MHz. range would be employed only if one was considering very small electrodes or electrode elements, i.e., squares, in the range of millimeters and smaller. As such, while the availability of frequencies "as high as 2 MHz" are noted in passing, U.S. Pat. No. 5,614,332 focuses on ways to "plastically deform" the electrode (see independent claims), and—in the same manner as U.S. Pat. No. 5,963,008—teaches away from the use of higher frequencies unless one is dealing with very small (millimeter-sized) electrodes or electrode squares.

Mechanical stimulation is much preferred to electrical stimulation, because it avoids many of the problems mentioned above with respect to wasted energy and added degradation. However, all of the prior art that involves mechanical stimulation focuses on the physical structures of the battery, and not on the chemistry which bonds the chemical reaction products to the electrodes. They all teach that where mechanical stimulation is concerned, the pertinent data for selecting frequencies are such things as the speed of sound in the medium being vibrated, and the physical size of the battery structure that one is looking to stimulate. Thus, as taught in column 6, lines 9-10 of U.S. Pat. No. 5,614,332, "[t]he frequency scales inversely with the battery electrode size." And, as taught starting at column 5, line 31 of U.S. Pat. No. 6,060, 198, "[t]he ultrasonic frequency to be selected and its intensity are functions of the structural characteristics of the entire battery." And, as clearly taught in U.S. Pat. No. 5,963,008 at column 4, lines 42-44, "[t]he nature and shape of the of the battery elements to be vibrated drives frequency selection."

There is no suggestion whatsoever about introducing mechanical excitations at energy levels at which covalent bonds are formed with the electrodes, and indeed, all of the patents which employ sound waves (mechanical stimulation) teach directly away from this by suggesting that frequency is determined based on the physical structure of the battery, and that higher frequencies are of interest only when small structural features are being considered. That is, these patents are wholly focused on manipulating the electrode or the battery structure—to remove not prevent sulfation and like effects in the first place—and not on preventing undesired bonding of chemical reaction products with the electrode.

SUMMARY OF THE INVENTION

Disclosed herein is a method and related device for improving energy performance and substantially preventing degradation of a chemical-to-electrical energy conversion process of an energy storage device, comprising the steps of mechanically exciting chemical reaction products within the energy storage device at energy levels proximate which covalent bonds with a matrix of the energy storage device would form absent excitation, thereby substantially maintaining ionic bonding between the chemical reaction products and the matrix and substantially preventing the chemical reaction products from covalently bonding with the matrix; and introducing the mechanical excitations into the energy storage device via an active material mechanically-responsive to electromagnetic signals, in response to an electromagnetic signal; whereby: degradation is substantially prevented by substantially preventing the covalent bonds from forming and by exciting the energy storage device mechanically rather than via degrading electrical excitation; and energy performance is improved by requiring lower amounts of energy for exciting the chemical reaction products via said active material than would be required to similarly excite the chemical reaction products without said active material, and by substantially preventing the covalent bonds from forming and causing degradation.

Further disclosed is a method and device with corresponding special technical features for improving energy performance and substantially preventing degradation of a chemical-to-electrical energy conversion process of an energy storage device, comprising the steps of: mechanically exciting an energy storage device at frequencies proximate resonant frequencies at which covalent bonds between chemical reaction products within and a matrix of the energy storage device would form absent excitation; and introducing the mechanical excitations into the energy storage device via an active material mechanically-responsive to electromagnetic signals, in response to an electromagnetic signal.

BRIEF DESCRIPTION OF DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Figure 1:
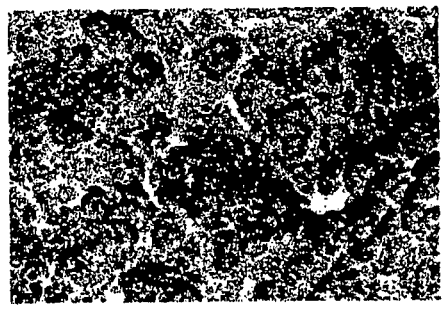
FIG. 1 is a photograph which illustrates a microscopic section of an electrode which has not been in contact with electrolyte.
Figure 2:
FIG. 2 is a photograph which illustrates a microscopic section of a similar electrode after six months of use.

This disclosure will demonstrate a method and/or a process that can be used within an energy storage device 10 (e.g., battery, or any other energy storage device 10 using a matrix 51 with an electrolyte) to prevent sulfate deposits or their counterparts from reaching a level that will degrade the device. In doing so, several benefits will become apparent.

However, this disclosure is not limited to energy storage devices. The disclosures herein will work to assist several types of reversible chemical reactions. A solar cell can benefit by better preparing the cell to transfer energy. And, in general, this disclosure can be used to help with any chemical reaction for which its constituents "plate out" thus impeding the reverse reaction. It is also the purpose of this disclosure to demonstrate, by applying this process to a technology already in place, the present limitations that will be eliminated. Energy storage devices, such as the lead-acid batteries used for illustration, but also nickel-cadmium; nickel-metal-hydride, lithium-ion, lithium-polymer, high temperature sodium-sulfur batteries and certain types of fuel cells, all will benefit from the use of this process.

Current methods of charging an energy storage device 10 are time consuming and inefficient. The time required completely to charge a lead-acid battery, for example, is on the order of hours. The energy put into a battery during this charge is always much greater than it returns. There are several factors that cause this to happen and the major ones will be discussed herein. Many attempts by the battery industry have minimized these shortcomings but have failed to eliminate them. The Active-Grid Technology (AGT) disclosed herein, eliminates all of them, not by using a chemically active substance, but—in a primary embodiment—by using an active electrode, or "smart" electrode, that is controllable. In this primary embodiment, the active electrodes vibrate at a very low level (amplitude) during both the discharge and charge cycles. During the discharge phase the bonds of the chemical reaction precipitates—lead sulfate ($PbSO_4$) in the case of a lead-acid battery—are kept unstable, i.e., at their highest energy state, thus preventing them from stabilizing and forming stronger bonds. Then, when the charge is applied, very little energy is required to send the excited sulfate ions back into solution. Currently-used techniques such as those described above are focused on re-conditioning a battery after degradation has already occurred. AGT is focused on preventing this degradation from happening in the first place. By preventing these detrimental bonds from forming in the first place, the energy required to break them in the reverse chemical reaction is not required, thereby substantially increasing the efficiency of the energy conversion process and avoiding damage to the battery structure. In addition, much of the prior art uses a process referred to as recombination. This process recombines gases produced within an energy storage device 10, thereby eliminating the detrimental effects associated with gassing. AGT is a process that will sharply reduce gassing before it ever occurs.

Again, lead-acid battery will be used for illustrative purposes. In a lead-acid battery, the matrix 51 is lead (Pb) or lead dioxide ($PbO_2$) and the electrolyte is sulfuric acid ($H_2SO_4$). During the discharge reaction, the chemical reaction products, particularly sulfate ($SO_4$) ions, will transfer electrons with the lead ions thus establishing an ionic bond. While the sulfates remains in the vicinity of the matrix 51, these bonds will drop to successively lower energy levels and covalent bonds will then form which ultimately degrade the energy conversion process. The resulting precipitate is $PbSO_4$. As this covalent relationship strengthens over time, going to successively lower energy states, sulfation (crystallization) will occur which will degrade the battery and eventually destroy it. AGT excites the chemical reaction products within the energy storage device 10 at energy levels proximate which covalent bonds with a matrix 51 of the energy storage device 10 would form absent excitation, thereby substantially maintaining ionic bonding between the chemical reaction products and the matrix 51 and substantially preventing the chemical reaction products from covalently bonding with the matrix 51. In the special case of a lead-acid battery, this means that AGT prevents sulfation and less energy is required to reverse the chemical reaction.

For a NiMH battery, the matrix 51 is NiO and MH, the electrolyte is KOH, and the goal is to prevent the chemical reaction precipitate $Ni(OH)_2$ from forming detrimental covalent bonds thus preventing crystallization and reducing the amount of energy required to reverse the chemical reaction. In this case, AGT excites the chemical reaction products $(OH)_2$ at the energy levels proximate which the covalent bonds between the Ni and $(OH)_2$ would otherwise form absent excitation, thereby substantially preventing the chemical reaction products from forming detrimental covalent bonds with the matrix 51.

For a NiCd battery, the matrix 51 is Cd and NiO, the electrolyte is KOH, and the goal is to prevent the chemical reaction precipitates $Cd(OH)_2$ and $Ni(OH)_2$ from forming detrimental covalent bonds thus preventing crystallization and reducing the amount of energy required to reverse the chemical reaction. In this case, AGT excites the chemical reaction products $(OH)_2$ at the energy levels proximate which the covalent bonds between the Ni and $(OH)_2$, and Cd and $(OH)_2$, would otherwise exist absent excitation, thereby substantially preventing the chemical reaction products from forming detrimental covalent bonds with the matrix 51.

For a Li-Ion battery, the matrix 51 is Li and some other type of alloy (X), and the goal is to prevent the chemical reaction product $LiXO_2$ from forming detrimental covalent bonds thus preventing crystallization and reducing the amount of energy required to reverse the chemical reaction. In this case, AGT excites the chemical reaction products $XO_2$ at energy levels proximate which covalent bonds between the Li and $XO_2$ would otherwise exist absent excitation, thereby substantially preventing the chemical reaction products from forming detrimental covalent bonds with the matrix 51.

Thus, it is to be understood that the term "matrix" as employed herein refers to whatever electrode material may be employed in a given type of battery, whether this is lead for a lead-acid battery, Ni for a NiMh battery, Cd for a NiCd battery, Li for a Li-Ion battery, or Ag and Zn for a AgZn battery. for example. This disclosure applies to similar batteries and their materials which are not expressly enumerated here, and as may be developed in the future. It is also recognized by this disclosure that the chemical reactions illustrated are only one of many of the reactions taking place within the energy storage device 10. This disclosure is concentrated on the majority reactions taking place within the energy storage device 10—that is, on the reactions which drive the production of energy during discharge, and on the reactions needed to reconstitute the electrolyte during recharge. Similarly, it is to be understood that the "chemical reaction products" refer generally to the free atoms or molecules that break free from the electrolyte during discharge and which in turn form ionic and covalent bonds with the molecules or atoms of the matrix 51 in which the covalent bonds tend to degrade the battery's performance over time and increases the energy required to reverse the chemical reaction. For a lead acid battery, the electrolyte is $H_2SO_4$, and one of the chemical reaction product is $SO_4$, which ionically bonds with Pb to form $PbSO_4$ precipitate, and it is the subsequent formation of covalent bonds between the Pb and the $SO_4$ which leads to the degradation of the battery performance and the excess energy required to reverse the chemical reaction and so is to be averted with AGT.

For a NiMh battery, the electrolyte is KOH, and the chemical reaction product is OH, which ionically bonds with the Ni to form $Ni(OH)_2$ precipitate, and it is the subsequent formation of covalent bonds which leads to the degradation of the battery performance and excess energy required to reverse the chemical reaction and so is to be averted with AGT. For a NiCd battery, the electrolyte is KOH, and the chemical reaction product is OH, which ionically bonds with the Ni and CD to form $Ni(OH)_2$ and $Cd(OH)_2$ precipitate and it is the subsequent formation of covalent bonds which leads to the degradation of the battery's performance and excess energy required to reverse the chemical reaction and so is to be averted with AGT. Again, this applies to similar batteries and their materials which are not expressly enumerated here, and as may be developed in the future.

Active Grid Technology (AGT) employs devices and methods that do not rely on applying damaging large voltages and/or currents across the battery potential, as is the case with the various electrical stimulation patents discussed earlier. It keeps the chemical reaction products, e.g., $SO_4$'s, stirred up during the discharge so that covalent bonds never form in the first place. If a $SO_4$ ion tries to go to a lower state so as to form a covalent bond with the energy storage device matrix 51, AGT will prevent it from doing so. Therefore smaller voltages and currents are required to recharge a battery, and the "jackhammer" of quick rise time currents is never needed.

To prevent the formation of sulfate bonds, the energy level of the $SO_4$ molecule must be maintained at a point where the electrons in the outer valence band are excited to the next higher band, leaving the atoms unbound with respect to one another. Thus it is necessary to excite these bonds, which will enable the excited molecule to move to a higher state. This process is administered during the discharge phase to keep substantially all bonds in the uppermost or highest excited state. Then, and only then, can the sulfate molecule be converted to a free ion in solution. When the reverse current (re-charge) is applied, it will give these elevated bonds the excess energy required to part from the matrix 51 and return to the electrolyte. This approach eliminates sulfation in the lead-acid example, and generally substantially maintains ionic bonding between the chemical reaction products and the matrix 51 and substantially prevents the chemical reaction products from covalently bonding with the matrix 51.

AGT elevates the bonds that form in an energy storage device 10 while it is being used as an energy source (discharge). In other words, as the storage device performs its intended function, AGT will not allow the sulfation to occur, and more generally will not allow the chemical reaction products to form covalent bonds with the matrix 51. AGT elevates these bonds by applying a low level disturbance proximate the frequencies for which the covalent bonds want to exist (lower energy states). This excitation aids in preventing sulfate ionic bonds (and more generally the bonds between the chemical reaction products and the matrix 51) from reaching these lower energy covalent states. Thus when the storage device is charged, only very small voltages and currents are needed to drive the chemical reaction products back into the electrolyte. AGT eliminates sulfation (and similar plating in other batteries) and its detrimental effects noted above. In doing so, AGT has paved the way to an effective and efficient energy storage device 10. Instead of using one form of energy to charge a storage device, AGT has divided into separate entities the energy used to charge a battery. Mechanical, rather than electrical energy is used to elevate the bonds created during the discharge phase. Since these bonds remain substantially elevated the lower energy covalent bonds are substantially prevented from forming. During the charge phase, both electrical and mechanical energy are used. In preferred embodiments, electrical energy is of course used to recharge the battery in the usual manner, and mechanical energy facilitates the driving of the chemical reaction products back into the electrolyte. This line of thinking shifts the paradigm away from that of sulfation elimination to that of sulfation prevention, thereby achieving storage device performance improvement AGT does not waste energy, and does not accept the associated degradation; it uses that excess energy for its intended purpose—it stores it and delivers it.

A lead-acid battery does not actually suffer from memory, but as the battery ages it acts as though it does. When the $PbSO_4$'s grow (crystallize) they cause stress on the matrix 51 and portions of the matrix 51 will fall to the bottom of the battery (shedding). Shedding lowers the capacity of the battery, diminishes the life of the battery and can cause shorted cells. When a reverse current is applied (charge) a majority of the $SO_4$'s are be driven back into solution. If the charge is not sufficient it will not be able to overcome the stronger bonds formed within the matrix 51. Sulfation and shedding are very limiting in battery design, and manufacturers have been trying to minimize these effects for decades. If these effects are eliminated, the battery could be made much smaller and its energy storage capacity can be maintained over time, substantially without loss as the battery ages. Battery manufactures presently design batteries to be larger than they need to be to compensate for anticipated degradation as they age. As much as two-thirds of the matrix 51 within a battery cell accounts for degradation over the life of the battery. Therefore by using AGT each battery can be designed at one-third of its original size and weight, and yet provide the same energy characteristics. This enables three time as much energy to be generated out of a battery of a given size. As the battery ages it does not lose energy storage capacity because AGT keeps the electrodes and the electrolyte in a 'as new' condition.

There are other factors that make current battery designs less than desirable. The energy required to charge a battery is always greater than the energy it supplies. Thus, batteries are very inefficient. While the battery discharges, chemical energy is converted to electrical energy. During the charge process, electrical energy is converted to chemical energy by reversing the chemical reaction. This requires higher-than-normal operating voltages to drive this chemical reaction in the reverse direction. As noted in the background of the invention, this higher voltage has two adverse effects. The first is that higher voltages cause gassing. Gassing occurs because when a cell is discharged a majority of the electrolyte left is water ($H_2O$). When $H_2O$ experiences a potential it will separate into its constituents (electrolysis), hydrogen and oxygen. As the potential increases so will the gassing. The effects of flammable gases being formed in a sealed container are obvious. The construction of a battery must take this into consideration. A battery must be constructed in such a way that it has the ability to relieve this generated gas. AGT allows the reverse chemical reaction to occur without using large voltage and currents. Therefore less gas is formed. Another, not so obvious, effect is that this formation of gas also takes away from the life of the battery. These gasses have no reason to go back into solution. This equates to a loss of water and therefore electrolyte. If the battery is a sealed unit, adding more water is not an option. Even though gas formation is undesirable it does cause mixing of the electrolyte within the cells. This has the advantage of minimizing stratification that can occur in some battery designs. Stratification occurs when certain levels of the electrolyte become more reactive than others because of gravity. The second adverse effect of higher voltage is that these additional chemical reactions generate heat Since the charge process is so time-consuming this heat addition can become a limiting factor during the charge, and can cause structural damage.

Most approaches to enhancing battery life and energy storage capacity focus on chemical means. AGT, however, is based on a mechanical, not a chemical approach. In essence, it stirs up the environment so that those stubborn $PbSO_4$ formations have no opportunity to form in the first place, and the $SO_4$'s have no choice but to go back into solution when the battery is recharged.

This new technology can be added during the manufacturing stage to any rechargeable battery exhibiting the problems mentioned above. The dimensions of the battery need not change. This technology can take many different forms within the battery. In some embodiment, this technology is added to the electrode grid. This addition will eliminate, and or minimize, all of the adverse effects mentioned above. The method by which this technology is incorporated into the electrodes may vary greatly. Regardless of the method of implementation, this technology will surely revolutionize batteries as we know them. This technology is based on mechanically exciting chemical reaction products within the energy storage device 10 at energy levels proximate which covalent bonds with a matrix 51 of the energy storage device 10 would form absent excitation. It employs an active material 31 mechanically-responsive to electromagnetic signals, such as, but not limited to, PZT.

It is also possible to retrofit a battery which has already been manufactured. In such a retrofitted embodiment, the end-user or the manufacturer merely adds an active material 31 to the terminals of the battery, driven by a control module. A majority of the electrode within a battery is made of a rigid type material. This rigid type material is used to telegraph the vibrations to the matrix 51. This latter method of exciting the matrix 51 requires more energy due the larger amplitude vibrations that are required to over-come the mechanical losses associated with the electrodes. For a top post type lead acid battery the actuators are manufactured to adhere to the post. They are of a tubular design and slip right over the terminal. Regardless of the method used to transmit vibrations to the matrix 51 the battery will benefit from AGT.

Figure 3:
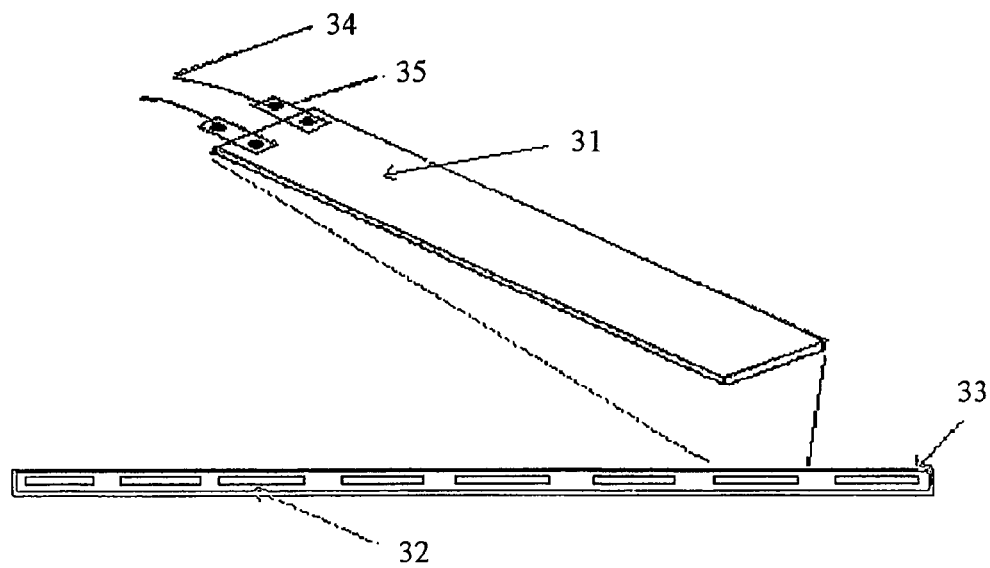
FIG. 3 is a schematic perspective view which illustrates lead zirconate titanate (PZT) film substrate housed within a material which will not react chemically within the cell, in one embodiment of the invention.

In one embodiment shown in FIG. 3, an active material 31 comprising a lead zirconate titanate (PZT) strip film substrate, or comparable material is housed within a protective material coating 32 which will not react chemically within the cell. The film substrate is very thin; several layers of PZT sheet 33 may be required. Note that the thickness of the PZT strip is preferably on the order of microns, and the thickness of the PZT sheet 33 is preferably on the order of mils. Also illustrated in FIG. 3 are internal leads 34 and connectors 35.

The protective coating 32 for the PZT strip film substrate preferably comprises an acrylic, plastic or polyurethane material. This material is thick enough to house this active material 31, yet thin enough to ensure that its vibrations are felt by the matrix 51. This coating material 32 provides electrical and chemical isolation from the matrix 51, electrolyte and battery terminals. It is also capable of transferring heat away from the PZT strip. It allows disturbances to be felt throughout the matrix 51. By a suitable choice of material, the protective material itself can increase the strength of the electrode. This allows manufacturers to concentrate on increasing the energy storage capacity of the battery rather than improving strength. Battery cells are currently designed to withstand external vibrations. With the use of AGT this design can shift to that of maximizing the energy storage efficiency of the battery. The film substrate forms strips, or other suitable arrangement, and is positioned so that when it vibrates it maintains (during discharge) or upsets (during recharge) the ionic bonds formed between the matrix 51 (e.g., Pb) and the chemical reaction products (e.g., $SO_4$). Leads 34 are attached internally to the actuation strips and allow a control module to be connected 35 externally. The bonds in the matrix 51 itself are much stronger, and if not will be made stronger. Several methods are available to strengthen bonds within the matrix 51. The matrix 51 itself can be doped with certain strengthening elements to increase the strength of the bonds within it.

In addition, or alternatively, a PZT crystal could be added to a rigid structure, in a predetermined position, to obtain the modal deflections desired on the surface. The dimensions of this rigid structure may also be determined based on enhancing the frequencies of interest. It is well known, for example, that the resonant frequency of a $PbSO_4$ crystal (lowest energy band) is at approximately 3.26 MHz. The higher energy levels associated with the $PbSO_4$ covalent and ionic bonds are resonant at higher frequencies. Benefits associated with AGT are achieved with driving signals in the frequency range from >400 KHz to 100 MHz. The frequencies at which the covalent bonds of interest will exist are approximately between 1 MHz and 10 MHz and excitations at these frequencies may be achieved many different ways. Actuators can be positioned to set-up standing waves that will stimulate the frequency range of interest. The driving signal need not be at and/or comprised of frequencies within the frequency range of interest. By scientifically determining various actuator configurations with the aid of computer analysis programs, such as NASTRAN®, AGT will set-up standing waves that will be subharmonics and/or harmonics of the driving signal. But the main goal is mechanically exciting chemical reaction products within the energy storage device 10 at energy levels proximate which covalent bonds with a matrix 51 of the energy storage device 10 would form absent excitation, irrespective of the driving frequencies which may be used to achieve this.

Figure 4:
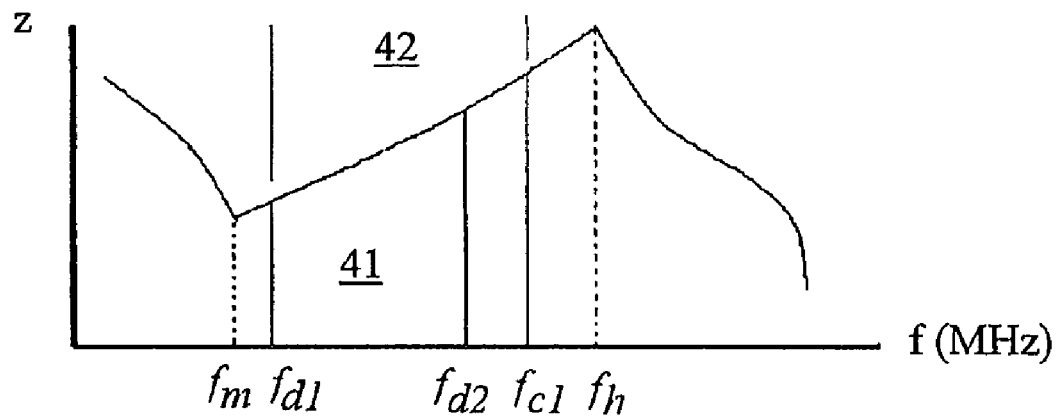
FIG. 4 is a graph illustrating a design approach for the PZT frequency oscillations during charge and discharge, when employed in various embodiments of the invention.

In some embodiments, AGT produces vibrations that sweep through these lower level energy states throughout the discharge cycle. During the charge cycle this range of frequencies swept thorough is extended to include the resonant frequency of highest energy $PbSO_4$ bond. FIG. 4 illustrates the design approach in the illustrative situation where PZT material is used to introduce these vibrations.

As shown the PZT material is operated over a linear range. The lowest frequency $f_m$ is the frequency at which the PZT has minimal displacement (z). The highest frequency $f_h$ is the frequency at which the PZT material undergoes maximum displacement. During the discharge (d) cycle 41 the AGT control module sweeps through a frequency band between $f_{d1}$ and $f_{d2}$. During the charge (c) cycle 42 the frequency band is increased to a range between $f_{d1}$ and $f_{c1}$. The dimensions of the vibrating plate is predetermined to maximize the response suitable for AGT.

This is illustrative of a number of important concepts. As noted earlier, mechanical excitations are preferably introduced during at least part of a time while the energy storage device 10 is discharged. Further, they are preferably introduced during at least part of a time while the energy storage device 10 is charged. During discharge, it is preferred to introduce the mechanical excitations at energy levels substantially maintaining the ionic bonds between the chemical reaction products and the matrix 51. During charge, it is preferred to introduce the mechanical excitations at energy levels substantially breaking the ionic bonds between the chemical reaction products and the matrix 51 and causing the chemical reaction products to return to an electrolyte of the energy storage device 10. This accounts for the fact that $f_{c1}$ is illustrated to be higher than $f_{d2}$ in FIG. 4. In some embodiments, it is preferred to sweep the mechanical excitations through a plurality of energy levels proximate energy levels of the covalent bonds. Particularly, it is preferred to sweep the mechanical excitations, during at least part of a time while the energy storage device 10 is discharged, through a discharge cycle plurality of energy levels proximate energy levels of the covalent bonds; sweep the mechanical excitations, during at least part of a time while the energy storage device 10 is charged, through a charge cycle plurality of energy levels proximate energy levels of the covalent bonds; and sweeping the charge cycle plurality of energy levels through at least one energy level higher than a highest energy level of the discharge cycle plurality of energy levels. Finally, this illustrates the desirability of mechanically exciting the chemical reaction products to an energy level proximate a lowest-energy level of the covalent bonds, and also, of mechanically exciting the chemical reaction products to an energy level proximate a higher-energy level of the covalent bonds.

Again, while lead zirconate titanate (PZT) is used here to illustrative the invention, it is but one example of an active material 31 that would be suitable for use in connection with the invention, and is in no way intended to limit the invention. Other examples of materials that would be suitable for use in this invention include, but are not limited to, ferroelectrics, electrostrictive, and magnetostrictive. More fundamentally, any material presently known in the art or which may in the future become known in the art will be suitable for use in this invention, providing that material has the ability to produce displacement in the frequency range mentioned above with an external excitation, and in particular, for sufficiently exciting sulfate molecules (and chemical reaction products generally) within an energy storage device 10 to an energy level such that electrons in the outer valence band of the sulfate molecules are excited to at least the next higher valence band of the sulfate molecules, thereby substantially preventing covalent bonds from forming between the sulfate molecules and the matrix 51 of the energy storage device 10 and enabling the chemical reaction products (e.g., sulfate molecules) to maintain a substantially unbound ionic state.

These small amplitude vibrations set up disturbances during discharge that cause the $PbSO_4$ bonds to remain at their highest state. These disturbances do not, however, drive the $SO_4$ ions away from the matrix 51 because they are still subject to the chemical attractive forces (ionic). Then, during charge, the $SO_4$ ions are driven back into the electrolyte during a time when their ionic bonds with the matrix 51 are not necessary. One thus achieves the best of both worlds.

Figure 5:
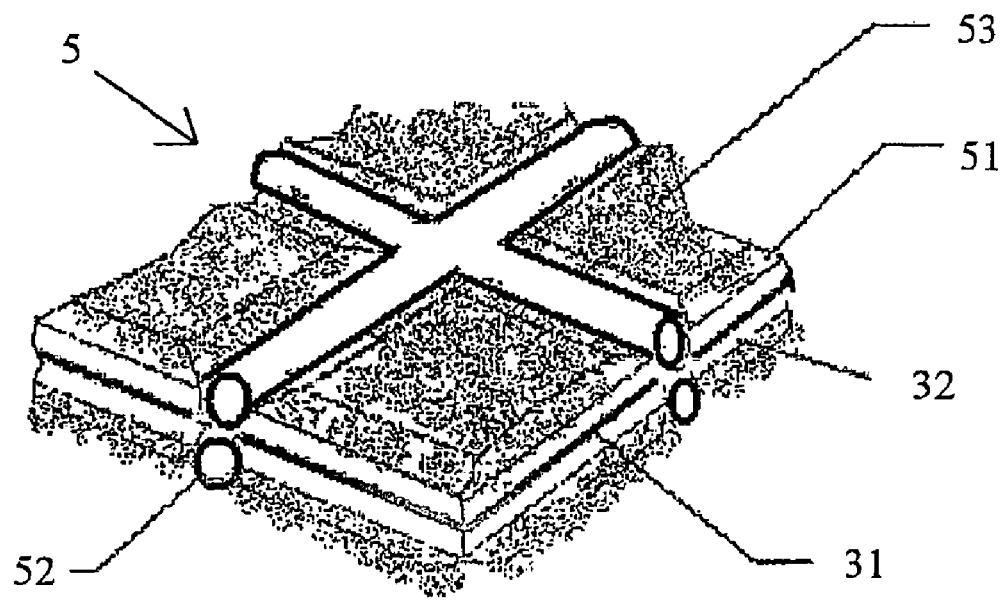
FIG. 5, not to scale, is a perspective view illustrating a small sectional cutaway view of an active battery grid in one embodiment of the invention, in a completely discharged state.

The active electrode, as shown in the embodiment of FIG. 5, is capable of handling a larger amount of current than its predecessors. We refer again to the lead-acid example. By pressing a grid on each side of the PZT sheet 33 comprising the active material 31 such as PZT strip film substrate and PZT sheet 32, (explained below), the same amount of Pb or $PbO_2$ matrix 51 can be pasted on during the manufacturing stage. The rigid structure that the paste adheres to is the PZT sheet 32 itself. The method of adhering the paste to the sheet is with the use of a Pb alloy grid lattice 52, which can take many forms, which penetrates the protective coating itself. The protective coating will take the place of grids currently used. The thickness of the electrode is comparable to that of current grids used in Pb-acid batteries. The Pb Alloy grid lattice 52 may be pressed on to the PZT sheet 32 and mounted. The thickness of the matrix 51 on each side of the PZT sheet can be less than its predecessors—preferably about one-half the size of current matrix designs. Until AGT there was no reason to reconfigure an electrode to include a ion-chemically reactive material. This process would only take away from the energy storage capacity of the battery. In addition, it would also limit the chemical reaction sites within the matrix 51 which reduce its current carrying capacity. The electrode is now designed to enhance the (Pb and $SO_4$ covalent bonding) frequencies desired to make AGT more beneficial. It maximizes the vibrations of interest to affect more $PbSO_4$ chains within the pores of the matrix 51. In addition, the electrolyte does not have any difficulty in reaching these chains. Therefore, for the same size battery, the energy storage capacity is larger. This increase in energy density will bring the lead-acid battery back to the front lines within the "hybrid" and "electric" markets. Also illustrated as a shaded "cloud" are $PbSO_4$ formations 53 on the matrix 51 surface.

With Active-Grid Technology, the battery can be recharged at any charge state. All the $SO_4$'s go back into solution during every charge, every time. Since there is no sulfation, shedding or gassing there is no reason why the battery should not last a lifetime. The following AGT charge and discharge model, illustrated in FIG. 6, will be used to explain the AGT process.

Figure 6:
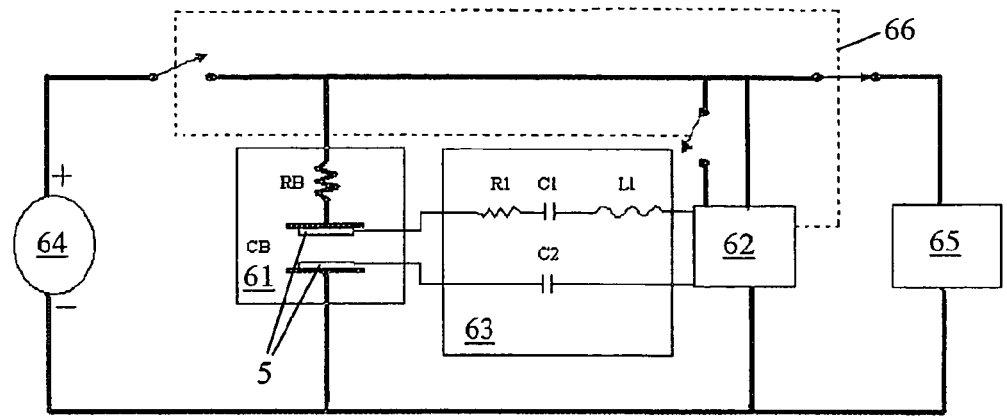
FIG. 6 is a circuit diagram illustrating a charge and discharge model for an energy storage device in various embodiments of the invention.

FIG. 6 demonstrates how AGT functions to manipulate the charge acceptance of a battery cell 61. The concept of changing the way a lead acid battery accepts a charge is not new in itself. Currently the methods used are based on enhancing the chemical make-up of the battery. AGT does not alter the chemical make-up nor the chemical reactions going on within a battery cell. The oxidation and reduction process is not changed in any way. The cell still transfers the same amount of electrons during the charge and discharge cycle. In the model of FIG. 6, the battery cell 61 is represented by parallel plates (CB) with internal resistance (RB). The plates shown have two structures between the plates which represent PZT sheets with the matrix 51 attached 5. The model shown is a fully charged battery which just started its discharge cycle. The AGT Control Module 62 is powered by the battery voltage and is used to drive the actuators within the PZT sheet 33. In the illustrated dynamic PZT model 63, the mechanical resonance of the PZT device is represented by L1, C1 and R1. Since it is a dielectric with electrodes it also has an electrical capacitance C2. This is a simplified model of the PZT device. Many forms of dynamic models are available for the PZT structures. The charge unit 64 can be any type of DC source such as an alternator in a car. The DC loads 65 are components such as motors, radios, fans etc. The switches 66 are currently shown in the discharging state. When a charge is applied the AGT Control Module (101 in FIG. 10) switches each switch to the charging position.

Figure 7:
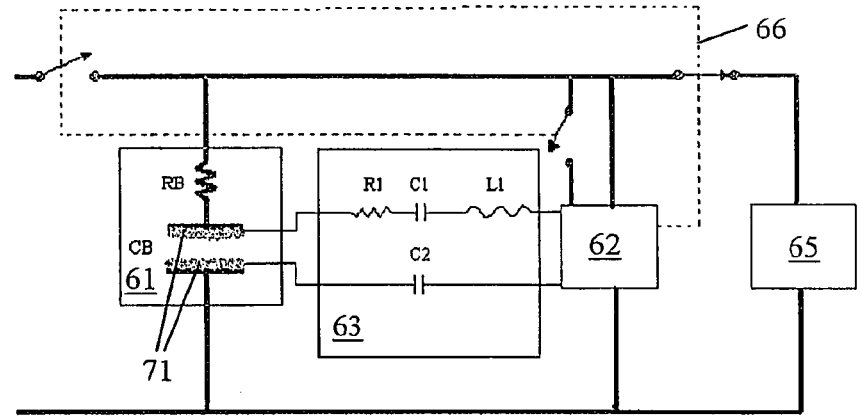
FIG. 7 is a circuit diagram illustrating a discharge model for an energy storage device in various embodiments of the invention.

As now illustrated in FIG. 7, during the discharge phase the battery discharges through RB, the DC loads and the AGT control module. The internal resistance of the battery is very small and compared to the DC load resistance the AGT control module resistance is very large. The control module does not draw a lot of power during the discharge phase. The amount of power drawn is comparable to the DC loads the battery is supplying. As the cells discharge, precipitates, e.g., $PbSO_4$'s form throughout and on the surface of the matrix 51. During this phase the AGT control module generates signals that drive the PZT actuators within the PZT sheet. The frequencies generated sweep through the resonant frequencies of the lower-energy $PbSO_4$ covalent bonds, and of the ionic bonds.

Continuing with the lead-acid example, as shown by the chemical reaction product "cloud" 71, the $SO_4$ ions collect on the plates in a random order. They chemically react with the Pb and $PbO_2$ matrix 51. The PZT sheet is vibrating while the battery discharges which keeps the $PbSO_4$ bonds in their highest energy (ionic) states. The $PbSO_4$'s thus no longer plate out on the matrix 51. Instead they form a compacted cloud 71 of very soft sludge type material. The pattern of distribution is dependent on the driving signal and the PZT sheet structure. As the battery discharges its terminal voltage decreases. The AGT control module is configured such that based on a predetermined condition (e.g., voltage level), the charge cycle starts. With AGT there is no longer a concern for the amount of discharge prior to charging; that is, the battery does not have to be fully discharged periodically to restore optimum efficiency. AGT will allow the battery to be charged at any time during the discharge cycle without fear of battery degradation due to sulfation.

Figure 8:
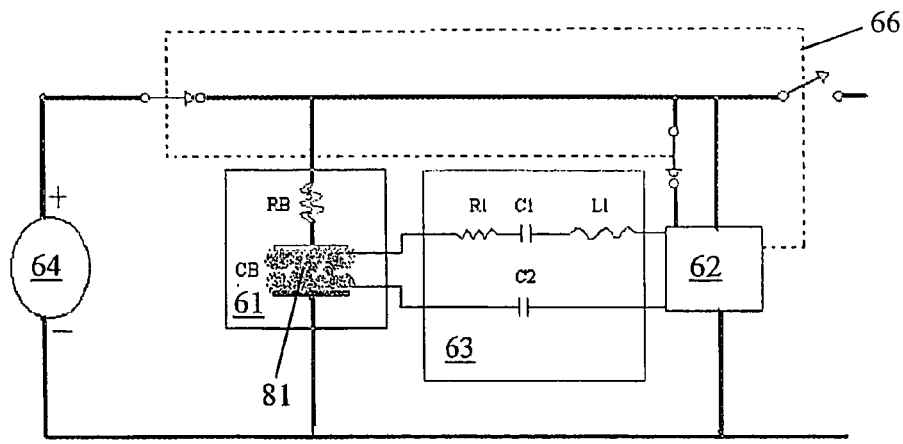
FIG. 8 is a circuit diagram illustrating a charge model for an energy storage device in various embodiments of the invention.

FIG. 8 now illustrates the charge cycle. When the charge cycle is called for the DC load switch opens, the charging switch shuts and an AGT control module switch shuts (these switches are generally referenced by 66 and they are controlled by control module 101). The AGT control module activates the PZT or similar active material 31 to extend the range of frequencies swept through, as discussed earlier in connection with FIG. 4. This added range includes the resonance frequency of the highest-energy $PbSO_4$ ionic bonds. As noted above and illustrated by the expanded cloud 81 in the vicinity of the CB plates, the $PbSO_4$ bonds disintegrate and the $SO_4$ is driven back into the electrolyte.

It is known throughout the industry that batteries exhibit capacitive effects. These capacitive effects are what AGT is focused on. A battery comprises plates and they are separated by a medium. The medium is the electrolyte and the $PbSO_4$ formation on the plates. In capacitor theory the dielectric between the plates is characterized by its electrical permittivity.

AGT also uses this relationship to describe the charging characteristics of a battery. In a dielectric the permittivity is dependent on frequency. This can be seen by the dependence of capacitive reactance on frequency. AGT manipulates the permittivity of the electrolyte and $PbSO_4$ formations by disturbing the formations with frequencies they are susceptible to. In turn, AGT has gained control of the electrical response characteristics of the battery. During the discharge phase the bonds are kept excited hence setting the storage device up for its charge phase. When the charge is applied the permittivity will be such that it offers less impedance to the charging source.

In one embodiment, the actual electrode grids themselves can be designed to incorporate and active material 31 mechanically-responsive to electromagnetic signals, such as PZT. Battery manufacturers often find themselves trying to explain why batteries fail early in life. In the past, they have claimed that the inherent piezoelectric effect within the battery cell actually causes the battery to fail early. Active-Grid Technology will not settle for this explanation—but it will exploit such effect by purposely introducing mechanical excitations at energy levels proximate which covalent bonds with a matrix 51 of the energy storage device 10 would form absent excitation.

In particular, if the plates have a piezoelectric effect then there is some expansion and contraction during charge and discharge and this may be causing batteries to fail early, sometimes catastrophically. One embodiment of AGT enhances (dopes) the electrodes to produce mechanical excitation around the frequencies of interest, frequencies at energy levels for which detrimental covalent bonds want to exist. Thus, this built-in piezoelectric effect can be exploited by an external means. This will require intentionally adding the correct proportions of zirconate and titanate (in the case of PZT), or their counter-parts, to the paste prior to its application to the grid lattice 52.

Researchers have demonstrated that batteries exhibit mechanical resonance which is a function of their structural design. Others have been trying to exploit this behavior to enhance shaking the sulfate crystals back into solution. Manufacturers, on the other hand, design batteries according to its operating platform. They are concerned with suppressing the mechanical instabilities rather then cultivating them. For instance, a car battery is designed to withstand vibrations on the order of 10-300 Hz because this is what an ordinary car would be subjected to on an average road. Undoubtedly, manufacturers take measures to ensure the cell can withstand continued sustained vibrations in this range, since several vibrational performance/endurance test must be passed prior to use in the industry.

AGT can take advantage of the piezoelectric effect inherent in the electrode paste. Active elements can be added to the paste to enhance its electromechanical response to frequencies at which the electrochemical performance can be altered. These active elements can be added to the preexisting chemical make-up of the electrode that will not alter the electrical response characteristics of the cell without some type of external excitation when can be subjected to control.

Instead of using large voltages and huge currents to dislodge the stubborn $SO_4$'s during the charging process as disclosed in the prior art—which itself causes damage to the battery—these $SO_4$'s will already be in the excited state because of mechanical excitations applied during discharge, and be dislodged mechanically, with a further impetus to removal from the DC charging itself. These disturbances are large enough to upset the $PbSO_4$ bonds but small enough not to upset the internal bonds of the matrix 51 itself. When a charging excitation is applied to the active grid it actuates the vibration devices within the matrix 51. The PZT driving signal is of a predetermined amplitude, shape and frequency to enhance the process. Most importantly, chemical reaction products within the energy storage device 10 at energy levels proximate which covalent bonds with a matrix 51 of the energy storage device 10 would form absent excitation, thereby substantially maintaining ionic bonding between the chemical reaction products and the matrix 51 and substantially preventing the chemical reaction products from covalently bonding with the matrix 51. The $PbSO_4$ bonds that build up in the pores of the matrix 51 disassociate with the aid of these mechanical excitations. The $SO_4$'s are forced into the electrolyte, and the time required to complete the charge is dramatically decreased. Higher voltages are not required to drive the $SO_4$'s into solution since they are assisted by a very-low-power-consuming device, namely, the active material 31. Therefore, gassing and heat generation—both of which damage the battery—are eliminated. Additionally, small amplitude disturbances set up in each active grid assembly via the control module minimize stratification.

The PZT, or equivalent active material 31 for introducing mechanical excitations, draws minimal current and may be modeled as a capacitor. Large voltages producing huge currents to drive the $SO_4$'s back into solution are no longer needed. The current charging systems will no longer have to supply large currents and can be reduced in size accordingly. Therefore, it is possible, for example, that instead of a 130 Amp alternator, a 30 Amp alternator will do the job.

This reduction in size and increased energy density will be useful in the automobile industry. In addition, no matter what the temperature, the user will enjoy full cold cranking amps every time. It is straightforward to use AGT for providing electrical power from said energy storage device 10 to a motor vehicle; and receiving electrical power into said energy storage device 10 from said motor vehicle.

Benefits will also be seen in the "hybrid" industry; the decreased charging time and increased efficiency will undeniably make running electric automobiles, trains, buses, and boats more appealing. In this situation, AGT may be used for powering a load using hybridized energy from a supplemental source of energy in addition to energy from said energy storage device 10, in varying proportions responsive to varying operating conditions.

The 'home battery system' is a great idea; unfortunately, it is a rich man's toy. If you lose power you simply switch over to reserve capacity to keep your home functioning. If you lose power when your battery pack has had time to charge up, which takes approximately 5 to 7 hours, it works well. The most expensive pail of this system is the equipment used to ramp up the power supplied by the grid. The advantage of being able to charge the battery pack at the voltages supplied by the grid is obvious. Active-Grid Technology will give this market the boost it has been looking for. Instead of waiting for power interruptions, one can continuously switch back and forth between power supplies. If the power grid is overloaded and expensive, one can simply switch over to battery power without worrying about the recharge time, as it will take much less time with AGT. At present, a major limitation of power generation and distribution systems is that power must be generated in real time, transmitted over the grid, and then used The ability to store large quantities of power made possible by AGT changes the situation dramatically, greatly enhancing the ability of the power grid to avoid blackouts, and providing emergency power whenever it is needed. In this situation, which has worldwide energy implications, AGT may be used for receiving electrical power into said energy storage device 10 from a power generation and distribution system; supplying electrical power from said energy storage device 10 into said power generation and distribution system; and load balancing said receiving and supplying of electrical power from and into said power generation and distribution system, in response to varying operating conditions.

AGT batteries are more compact, last longer, charge quicker and only require about as much power to re-charge as was expended because of their increased efficiency and their elimination of many sources of energy loss. The vibrations of the active grid elements are very small in amplitude; they are not even noticeable to the user. This vibrating surface does not cause interference with the adjacent plates because the actual displacement from the centerline of the grid is on the order of microns. The vibrations are of sufficient amplitude and frequency to dislodge the excited $SO_4$'s into solution. The remaining $PbSO_4$'s are unbonded and the $SO_4$'s returned to the electrolyte, and the speed of the reaction is greatly enhanced.

Figure 9:
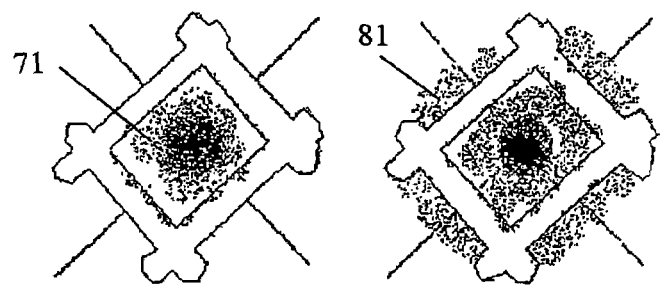
FIG. 9 is a top plan view which illustrates an exploded view of an active grid element, as well as the sulfate or similar "clouds" which form about this element.

FIG. 9 is an exploded view of an active grid electrode element. On the left is a completely discharged electrode grid element. On the right is that same element during charge with an actuation applied to the active grid. The matrix 51 is not shown and the PZT film substrates, within the PZT sheet, are shown as discrete elements for the purpose of clarity. Note the dense, ionically-bonded $PbSO_4$ cloud 71 on the left and the expanded, more dispersed $SO_4$ cloud 81 on the right which includes unbonded $SO_4$'s which have been excited back into the electrolyte.

Figure 10:
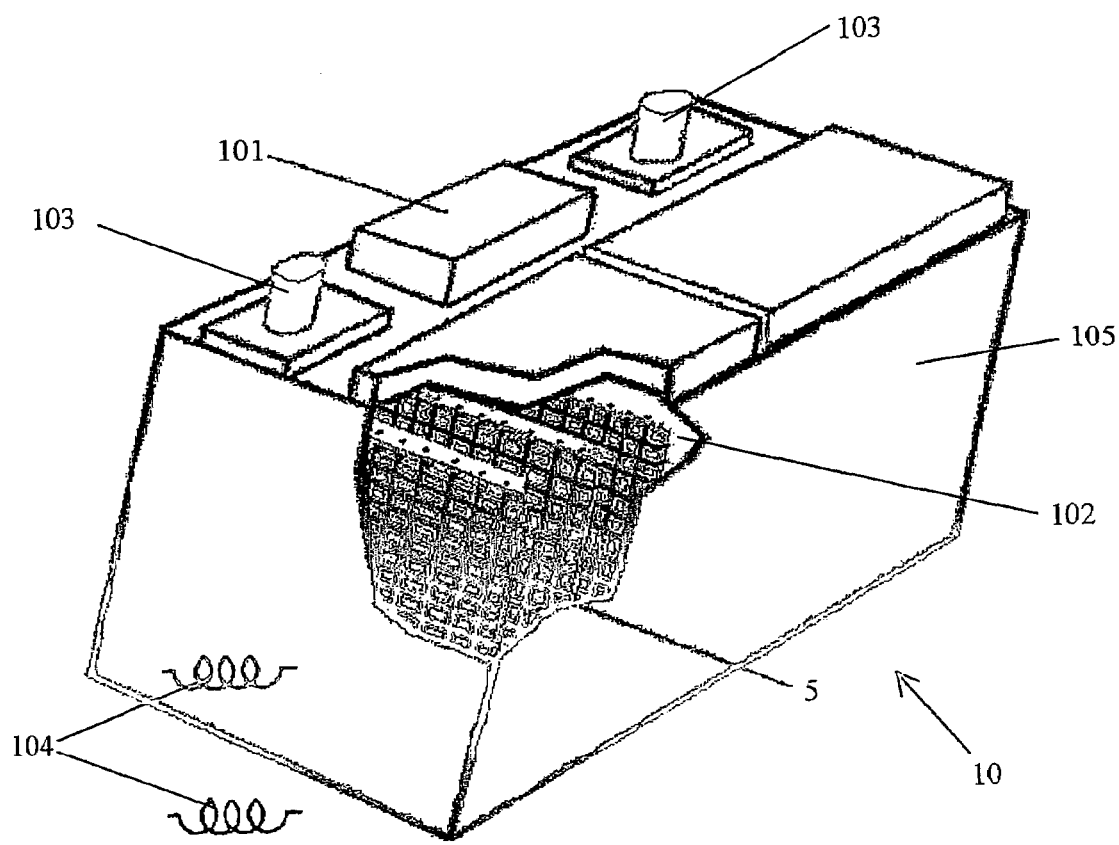
FIG. 10 illustrates an AGT energy end product, e.g., battery, in various embodiments.

The actuation signal is specifically tailored to excite the unwanted bonds; it is designed to maximize the speed at which the chemical reaction products, e.g., $SO_4$'s are dislodged. It is applied to the actuators externally by the control module 101 mounted directly on the battery as shown in FIG. 10, or possibly within the battery (not shown). The active elements themselves can be made of any type of active material 31 or equivalent. The signal amplification required for Active-Grid Technology does not require an elaborate control system. During the discharge and charge process a waveform generated within the control module is applied to the active grid 5 assemblies. This control module, preferably, is powered by the battery during the discharge and by the charging system during the charge.

The Pb and $PbO_2$ grids are very soft. While the grid elements in some types of batteries are harder, improving stiffness of softer grids is the focus of much research. That is why grid lattices are used with separators that help to support the soft electrodes. A better alternative for grid lattices is the use of a PZT sheet. In the embodiment of FIGS. 3 and 5, the actuators are within these sheets. There is an active vibrating film substrate everywhere the matrix 51 is present. The material used for the sheet is fairly rigid and does not take part in any reactions. FIG. 10 is a drawing illustrating battery itself with the active material 31. The electrolyte and separators are not explicitly shown, but would be in regions such as designated by 102. As noted above, the appearance and relative physical dimensions of the battery remain unaltered. As mentioned earlier, the absolute battery dimensions needed to obtain a given energy result are reduced. The battery posts 103 can also comprise the active material 31.

Active-Grid Technology is the next generation battery. The use of a PbO paste to convert chemical energy to electrical energy is not new, but the idea that this paste can be doped with certain substances, like zirconate and titanate, and then caused to mechanically oscillate to achieve this technology via the matrix 51 is novel and inventive. This is a battery which never sleeps. The plates are working continually to keep the $SO_4$ ions in constant confusion. If these ions try to settle in, they are kicked out by the next vibration. Since chemical attraction is stronger than the mechanical energy, the electron transfer is unimpeded. Instead of painting the matrix 51 with $SO_4$ chains, the $SO_4$'s form a cloud at a safe distance from the formation sites. When a reverse polarity is applied to recharge the battery, the cloud dissipates into the electrolyte, and the battery is fully charged much more quickly.

Will this technology consume the power stored in the battery by keeping the plates vibrating? This is a good question. Scientists understand that one can achieve large forces with only a small amount of power. This is what makes this type of active material 31 so appealing. The amount of power used to vibrate the plates at this microscopic level is on the order of 1-3% of the capacity of the battery. Indeed, during experimental testing of AGT, is was demonstrated that the average energy used to cause vibration was approximately 1% of the capacity of the cell. This is not much to give up to gain the benefits associated with AGT.

The lead-acid battery has staying power in the industry. New batteries, such as Ni—Cd, lithium, and Ni—Mh, have several advantages, but they also suffer disadvantages similar to those discussed above. With AGT their disadvantages can be eliminated. Regardless of the type of battery this technology is applied to, the following benefits will be achieved: this technology will eliminate sulfation (and analogous effects in other batteries) shedding, memory, gassing, aging and freezing; it will reduce the charging time of a lead-acid battery from hours to minutes reduce stratification, allow a battery to be charged with voltage comparable to its operating voltage, return the battery to a like-new condition on every charge and increase the life of the battery; it reduces the amount of heat produced during the charge and reduces the amount of deformation within the cell; it increases the time the battery can be operated under load and the load carrying capabilities of the battery. All these things can be achieved without altering the physical dimensions of the battery, and indeed, can be achieved in a smaller space.

Indeed, if the frequencies are targeted correctly then the only bond that will have to be broken during the charge is the ionic bond between the $SO_4$ ion and the matrix 51. By setting the cell up to accept charge all the current chargers on the market will work much more efficiently. Presently, robust chargers are employed to jam the energy into the cell without the ability to effect the cell and make it more compatible with the charger.

AGT will change the way we look at a battery. We already have 'smart' phones, cards, missiles, skis, and rackets, now we will have a 'smart battery'. When the efforts of battery manufacturers turn to this new technology, many more possibilities will become apparent. AGT is not focused on finding better chemicals to make batteries with; it is focused on improving what we have. In an alternative embodiment, a magnetic field might be used to control little pieces of iron within the battery electrolyte so that when excited they will form the active material 31 used to scrub the plates clean. As noted above, electrode paste could be chemically doped so that when a charge is applied the paste itself vibrates so the unwanted bonds are shaken away. Active materials 31 can be suspended in the electrolyte or connectors 102. They can comprise part of the casting 105. The current used to actuate the active materials 31 can be introduced in conventions ways (e.g., across the battery potential) or in unconventional ways such as by magnetic induction techniques 104 such as those set forth in U.S. Pat. No. 6,040,680. All these possibilities and many others will suggest themselves once the battery experts shift their paradigm. In the future, reference to an active substance within a battery will require further clarification. Is it chemically active, or is it mechanically 'active'?

Why hasn't AGT already been developed? First and foremost, battery experts have been improving on lead-acid battery technology for years. If they stumbled on a process that caused motion within a battery, they promptly eliminated it. The practice of moving plates within a battery cell was not something they would see as desirable. When the push came for a more energy-efficient battery technology, everyone looked towards new chemical reagents as the way to go, new and exciting technologies that will be around for a long time. Those manufacturers that continued in lead-acid technology came up with the gel-cell, advanced lead-acid and valve regulated lead-acid (VRLA) batteries.

Materials science is a very new and exciting field. The possible gains associated with this science are endless. Smart labs across the world are applying this science to just about everything under the sun. They have turned houses into auditoriums by making speakers out of their windows, they have developed a ceramic material that lubricates itself, they have made helicopter rotors that bend on control, they have made a lube oil that changes its viscosity with a magnetic field control signal, and they have made airplane wings that change their shape when a current is applied. There is no end to the applications of this science. AGT is the next logical step in applying this science to the battery.

PZT was chosen to illustrate AGT because it is convenient and is readily available today. It is functioning around the world, and in space. The major limitation found in using this material is its user's inability to control it. This material is susceptible to non-linear response if used over a large range of input signals. In other words, if you apply a square-wave electrical input signal you will not necessarily get a square-wave response. Scientists and engineers are frantically pursuing methods to model accurately, and thus control, this type of material. The major push in this science is in developing a material that has both a large displacement and that can be accurately controlled throughout this displacement. While great progress is being made in this area, AGT does not require large displacement, nor does it require elaborate control systems; AGT uses this material the way it wants to be used—it just vibrates it.

AGT is intentionally moving the internal parts of a battery from within the battery itself. AGT does not discriminate between batteries. Any battery that uses chemical reagents can benefit from AGT. Any battery requiring external energy to drive the chemical reaction in the opposite direction can benefit from AGT. This technology can be applied to all types of batteries, as elaborated earlier. As set forth above, AGT is a preventative maintenance system. It stops the build-up of chemical reaction products, e.g., $SO_4$'s from collecting in a region where one does not want them, as opposed to trying to remove them once they are there.

Battery manufacturers still have the choice of which battery technology to follow. Recent advances in nickel-cadmium; nickel-metal-hydride, lithium-ion, lithium-polymer and high temperature sodium-sulfur batteries are promising. Unfortunately, these battery technologies will suffer growing pains. If one considers the fact that lead-acid batteries have been around for 100 years, and are still being improved, these new technologies have a long way to go. AGT can improve all of them, old and new.

Although much of the illustration herein is based on a battery, the devices and method disclosed herein can be applied to a broad range of energy technologies, including solar energy cells.

In a preferred embodiment, the mechanical excitations introduced into the energy storage device 10 via the active material 31 are periodic oscillations, that is, vibrations at a period oscillation frequency such a sin wave oscillating over a domain of greater than $2\pi$. This is to be distinguished from a single, sharp rise time pulse followed by a quiescent period much greater than the rise time, such as employed in many of the prior art patents discussed in the background of the invention. It is less preferred, though still acceptable, to mechanically pulse the chemical reaction products with a pulse of a predetermined rise time.

It is to be understood that someone might wish to supplement the mechanical excitations disclosed herein and the various method of achieving them, with more conventional types of electrical stimulation such as but not limited to the types of electrical stimulation disclosed in the prior art. For example, one might engage in the steps of electrically exciting, in addition to said mechanically exciting, the chemical reaction products within the energy storage device 10 at said energy levels proximate which covalent bonds with the matrix 51 of the energy storage device 10 would form absent excitation, thereby further substantially maintaining ionic bonding between the chemical reaction products and further substantially preventing the chemical reaction products from forming covalent bonds with the matrix 51; and introducing the electrical excitations into the energy storage device 10 via an electric current comprising non-DC components, in addition to said electromagnetic signal. In a preferred embodiment of this approach, a small-amplitude, AC ripple current is used to supplement the mechanical excitations, further preventing the chemical reaction products from settling down into covalent bonds with the matrix 51.

One might also engage in the steps of electrically exciting, in addition to mechanically exciting, the chemical reaction products within the energy storage device 10 at energy levels suitable for substantially breaking the ionic bonds between the chemical reaction products and the matrix 51 and causing the chemical reaction products to substantially return to an electrolyte of the energy storage device 10, thereby substantially breaking the ionic bonds between the chemical reaction products and the matrix 51 and causing the chemical reaction products to substantially return to an electrolyte of the energy storage device 10; and introducing the electrical excitations into the energy storage device 10 via an electric current comprising non-DC components. in addition to said electromagnetic signal. This is particularly helpful during the charge cycle, where a current is already being pumped into the energy storage device 10 in order to recharge it. Thus, for example, by overlaying a small AC ripple on the charging current, further impetus is provided to break the ionic bonds with the matrix 51 and drive the chemical reaction products back into the electrolyte. Because the chemical reaction products are already in an excited state because of the mechanical excitations state and have not been permitted to ever form covalent bonds with the matrix 51, the energy required for this small AC ripple is much less than the energy that would be required to break covalent bonds had they been allowed to form in the first place. Therefore, the electrical stimulus does not need to be as strong and the adverse effects discussed earlier are more readily averted.

Thus, supplemental electrical stimulation can be mixed and matched with mechanical stimulation in various combinations. Mechanical stimulation can be used to prevent covalent bonding in the first place during discharge, and electrical stimulation—requiring much less energy—can be employed to drive the chemical reaction products back into electrolyte during charge. More generally, the step of introducing said mechanical excitations may further comprise introducing said mechanical excitations during at least part of a time while the energy storage device 10 is charged; and the step of introducing the electrical excitations may further comprise introducing said non-DC components during at least part of a time while the energy storage device 10 is discharged. Or, vice versa, the step of introducing said mechanical excitations may further comprise introducing said mechanical excitations during at least part of a time while the energy storage device 10 is discharged; and said step of introducing the electrical excitations may further comprise introducing said non-DC components during at least part of a time while the energy storage device 10 is charged.

The method and associated devices disclosed herein, of mechanically exciting chemical reaction products within the energy storage device 10 at energy levels proximate which covalent bonds with a matrix 51 of the energy storage device 10 would form absent excitation, thereby substantially maintaining ionic bonding between the chemical reaction products and the matrix 51 and substantially preventing the chemical reaction products from covalently bonding with the matrix 51; and introducing the mechanical excitations into the energy storage device 10 via an active material 31 mechanically-responsive to electromagnetic signals, in response to an electromagnetic signal; whereby: degradation is substantially prevented by substantially preventing the covalent bonds from forming and by exciting the energy storage device 10 mechanically rather than via degrading electrical excitation; and energy performance is improved by requiring lower amounts of energy for exciting the chemical reaction products via said active material 31 than would be required to similarly excite the chemical reaction products without said active material 31, and by substantially preventing the covalent bonds from forming and causing degradation, is clearly novel and nonobvious over all of the prior art discussed in the background of the invention.

So too, the method and associated devices disclosed herein, of mechanically exciting an energy storage device 10 at frequencies proximate resonant frequencies at which covalent bonds between chemical reaction products within and a matrix 51 of the energy storage device 10 would form absent excitation; and introducing the mechanical excitations into the energy storage device 10 via an active material 31 mechanically-responsive to electromagnetic signals, in response to an electromagnetic signal, is clearly novel and nonobvious over all of the prior art discussed in the background of the invention. We now turn to examine some of the benefits of the devices and methods disclosed herein, in relation to the prior art.

Mechanical excitations as disclosed herein, are clearly preferable to electrical excitations, because as noted earlier, electrical excitations degrade the energy storage device 10 by attacking the structural elements of that device, and because a fair amount of energy is required to create electrical excitations strong enough to remove sulfates and similar deposits once they are already bonded to the matrix 51. If more energy is used to prevent sulfation-like effects than is saved by preventing these effects in the first place, the net result is an energy loss and this is part of the problem with much of the prior art that employs electrical stimulation. If sharp pulses rather than gentle, periodic oscillations are used as disclosed in the prior art, this sledgehammer effect is very damaging to the energy storage device 10 structure. If energy levels below the covalent bonding energies are employed, the results are simply much less effective. If after-the-fact removal of sulfates is the goal—as it is in the prior art—then much of the damage is already done, and the energy needed to undo the damage—as well as the damage cause by removal itself—is sharply increased. As with many things, preventing the chemical reaction products from covalently bonding with the matrix 51 is far preferable to removing the chemical reaction products after they are already bonded.

The considerations that underlie the prior art when using electrical stimulation do not carry over in an obvious way to situations where mechanical stimulation is applied. That is, one cannot simply say: let's take whatever is done electrically, and mimic it mechanically instead. The prior art itself makes this clear. While die speed of an electromagnetic wave or an oscillating current can be regarded as "instantaneous" with respect to the physical structure and dimensions of the energy storage device 10, the speed of a mechanical vibration—which is effectively a sound wave albeit at ultrasonic frequency—is much slower. The speed of mechanical vibration is, of course, the speed of sound through the transmission medium. As a result, the dynamics of propagation are—and are perceived by the prior art to be—quite different than in the electrical case. This is what has led the mechanically-based prior art to teach that the choice of frequency ought to be determined by the physical structural characteristics of the energy storage device 10, with frequency of excitation varying inversely with physical dimensions. This approach teaches directly away from mechanically exciting chemical reaction products within the energy storage device 10 at energy levels proximate which covalent bonds with a matrix 51 of the energy storage device 10 would form absent excitation, as is disclosed and claimed herein, irrespective of the physical characteristics of the energy storage device 10.

Additionally, with the electrical approaches, one would not be inclined to take DC power from the energy storage device 10 while it is discharging, convert it to high-frequency AC, and then pump it back into the energy storage device 10 to keep the chemical reaction products from forming covalent bonds with the matrix 51. There is simply too much energy required to do this. On the other hand, a small amount of the energy storage device 10 energy could be used to vibrate an active material 31, with much higher effectiveness and much less energy usage. Thus, it becomes highly practical with mechanical approaches to address sulfation-type effects during the discharge cycle, rather than wait for the charge cycle when a charger is available to pump in high energy pulses to dislodge deposits. And, because it is much more feasible with mechanical approaches to stir up the chemicals during the discharge in addition to the charge cycle, prevention is facilitated over remediation, and "blasting" the deposits is replaced with gently coaxing the deposits, with no ill effects on the energy storage device 10. The contrast between what is feasible with electrical stimulation and what is feasible with mechanical stimulation is analogous to removing ice from a frozen surface at 0° F. with an ice pick which also damages the surface and requires a great deal of energy, or maintaining the ice near phase change proximate 32° F. and then sweeping away the loose slush with a broom that easily clears the surface without damage. So, once a mechanical approach is selected, the process as a whole must be approached differently, and what is known from electrical approaches simply does not carry over in an obvious manner to mechanical approaches.

Using mechanical excitation, the present disclosure teaches how to select the optimum frequency or frequencies of mechanical excitation, in order to optimize the energy efficiency of the energy storage device 10 and avoid degradation. That is, the central question is: for mechanical stimulation of energy storage devices, what frequencies should be used, and on what basis are these frequencies selected? The prior art teaches that mechanical stimulation frequencies are to be selected with reference to the physical characteristics of the energy storage device 10, including the size of the electrode elements, which leads toward sub-MHz frequencies in most instances other than for very small electrodes or electrode elements. This disclosure, in sharp contrast, teaches that the physical properties of the batteries do not matter and that the selection of mechanical frequencies are invariant with respect to the physical characteristics of the energy storage device 10. Rather, the frequencies are to be chosen with reference to the energy levels proximate which covalent bonds with a matrix 51 of the energy storage device 10 would form absent excitation.

From this, many further consequences can be deduced. First, this disclosure teaches how to improve energy storage device 10 performance not just for a single type of energy storage device 10, but for all types of chemical-to-energy energy storage device 10. This is because the key starting point in all cases, are the covalent bonding energies. There is no one "correct" frequency, because different energy storage device 10 types will exhibit undesired covalent bonding at different energies which are based on the chemical nature of their constituents, not their physical, dimensional characteristics as taught in the prior art. Based on this, the recipe for choosing frequencies in any given situation is clear, even for chemical-to-electrical energy storage devices not yet known today, or for energy storage devices employing electrode and electrolyte materials which are not yet known today.

Second, this disclosure teaches that the goal is twofold: during discharge, to maintain ionic bonds between the chemical reaction products and the matrix 51, because these are necessary to produce energy, and during charge, to break the ionic bonds and drive the chemical reaction product back into the electrolyte thereby returning the energy storage device 10 into an "as new" state. Here too, once this recipe is laid out, the selection of frequencies follows from an understanding of the chemical constituents and their various covalent and ionic bonding energies. During discharge, the frequencies are chosen to keep covalent bonds from forming at the various energy levels where they would otherwise be prone to form. During charge, preferably, the frequencies are further ramped up to break the ionic bonds and drive the chemical reaction products back into the electrolyte. In addition to breaking the ionic bonds, the mere physical vibration itself also shakes up the whole energy storage device so that the chemical reaction products mix back onto the electrolyte and restore the device into its "as new" state.

As a consequence of all of the foregoing, degradation is substantially prevented by substantially preventing the covalent bonds from forming and by exciting the energy storage device 10 mechanically rather than via degrading electrical excitation; and energy performance is improved by requiring lower amounts of energy for exciting the chemical reaction products via said active material 31 than would be required to similarly excite the chemical reaction products without said active material 31, and by substantially preventing the covalent bonds from forming and causing degradation.

Once this sort of approach is known, then the electrical stimulus approaches take on a new light, and they can be used in smaller "doses" to supplement the mechanical approaches disclosed here without damage to the energy storage device 10 structure, as discussed earlier in this disclosure.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

The invention claimed is:

1. A method for improving energy performance and substantially preventing degradation of a chemical-to-electrical energy conversion process of an energy storage device (10), comprising the steps of:
   mechanically exciting chemical reaction products within the energy storage device (10) at energy levels proximate which chemical covalent bonds with a matrix (51), i.e., electrode material of the energy storage device (10) would form absent excitation, thereby substantially maintaining ionic bonding between the chemical reaction products and the matrix (51) and substantially preventing the chemical reaction products from covalently bonding with the matrix (51); and
   introducing the mechanical excitations into the energy storage device (10) via an active material (31) mechanically-responsive to electromagnetic signals, in response to an electromagnetic signal; whereby:
   degradation is substantially prevented by substantially preventing the covalent bonds from forming and by exciting the energy storage device (10) mechanically rather than via degrading electrical excitation; and
   energy performance is improved by requiring lower amounts of energy for exciting the chemical reaction products via said active material (31) than would be required to similarly excite the chemical reaction products without said active material (31), and by substantially preventing the covalent bonds from forming and causing degradation.

2. The method of claim 1, said step of mechanically exciting comprising:
   mechanically vibrating the chemical reaction products at a predetermined periodic oscillation frequency.

3. The method of claim 1, said step of mechanically exciting comprising:
   mechanically pulsing the chemical reaction products with a pulse of a predetermined rise time.

4. The method of claim 1, said step of mechanically exciting further comprising:
   mechanically exciting the chemical reaction products to an energy level proximate a lowest-energy level of said covalent bonds.

5. The method of claim 1, said step of mechanically exciting further comprising:
   mechanically exciting the chemical reaction products to an energy level proximate a higher-energy level of said covalent bonds.

6. The method of claim 1, said step of mechanically exciting further comprising:
   mechanically exciting the chemical reaction products to an energy level proximate a lowest-energy level of said covalent bonds; and
   mechanically exciting the chemical reaction products to a higher energy level proximate a higher-energy level of said covalent bonds.

7. The method of claim 1, further comprising the step of:
   powering said step of the introducing said mechanical excitations into the energy storage device (10), using at least some electrical power from the energy storage device (10).

8. The method of claim 1:
   the matrix (51) comprising lead (Pb);
   the chemical reaction products comprising sulfate ($SO_4$); and
   the covalent bonds comprising lead sulfate ($PbSO_4$) covalent bonds.

9. The method of claim 8, said step of mechanically exciting further comprising:
   mechanically exciting the chemical reaction products at frequencies comprising approximately 3.26 MHz.

10. The method of claim 9, said step of mechanically exciting further comprising:
    mechanically exciting the chemical reaction products at at least one frequency higher than approximately 3.26 MHz.

11. The method of claim 1:
    the matrix (51) comprising NiO and MH;
    the chemical reaction products comprising $(OH)_2$; and
    the covalent bonds comprising $Ni(OH)_2$ covalent bonds.

12. The method of claim 1:
    the matrix (51) comprising Cd and NiO;
    the chemical reaction products comprising $(OH)_2$; and
    the covalent bonds comprising $Cd(OH)_2$ and $Ni(OH)_2$ covalent bonds.

13. The method of claim 1:
    the matrix (51) comprising Li and another alloy X;
    the chemical reaction products comprising $XO_2$; and
    the covalent bonds comprising $LiXO_2$ covalent bonds.

14. The method of claim 1, said step of introducing said mechanical excitations further comprising:
    introducing said mechanical excitations during at least part of a time while the energy storage device (10) is discharged.

15. The method of claim 1, said step of introducing said mechanical excitations further comprising:
    introducing said mechanical excitations during at least part of a time while the energy storage device (10) is charged.

16. The method of claim 1, said step of introducing said mechanical excitations further comprising:
    introducing said mechanical excitations during at least part of a time while the energy storage device (10) is discharged; and
    introducing said mechanical excitations during at least part of a time while the energy storage device (10) is charged.

17. The method of claim 1, said step of introducing said mechanical excitations further comprising:
  introducing said mechanical excitations during at least part of a time while the energy storage device (10) is discharged; and
  introducing said mechanical excitations during at least part of the time while the energy storage device (10) is discharged at said energy levels substantially maintaining the ionic bonds between the chemical reaction products and the matrix (51).

18. The method of claim 1, said step of introducing said mechanical excitations further comprising:
  introducing said mechanical excitations during at least part of a time while the energy storage device (10) is charged; and
  introducing said mechanical excitations during at least part of the time while the energy storage device (10) is charged at energy levels substantially breaking the ionic bonds between the chemical reaction products and the matrix (51) and causing the chemical reaction products to return to an electrolyte of the energy storage device (10).

19. The method of claim 1, said step of introducing said mechanical excitations further comprising:
  introducing said mechanical excitations during at least part of a time while the energy storage device (10) is discharged;
  introducing said mechanical excitations during at least part of the time while the energy storage device (10) is discharged at said energy levels substantially maintaining the ionic bonds between the chemical reaction products and the matrix (51);
  introducing said mechanical excitations during at least part of a time while the energy storage device (10) is charged; and
  introducing said mechanical excitations during at least part of the time while the energy storage device (10) is charged at energy levels substantially breaking the ionic bonds between the chemical reaction products and the matrix (51) and causing the chemical reaction products to return to an electrolyte of the energy storage device (10).

20. The method of claim 1, further comprising the step of:
  sweeping said mechanical excitations through a plurality of said energy levels proximate energy levels of said covalent bonds.

21. The method of claim 1, further comprising the steps of:
  sweeping said mechanical excitations, during at least part of a time while the energy storage device (10) is discharged, through a discharge cycle plurality of energy levels proximate energy levels of said covalent bonds;
  sweeping said mechanical excitations, during at least part of a time while the energy storage device (10) is charged, through a charge cycle plurality of energy levels proximate energy levels of said covalent bonds; and
  sweeping said charge cycle plurality of energy levels through at least one energy level higher than a highest energy level of said discharge cycle plurality of energy levels.

22. The method of claim 19:
  the energy storage device (10) comprising a lead-acid battery; and
  said step of mechanically exciting further comprising mechanically exciting the chemical reaction products at frequencies comprising approximately 3.26 MHz.

23. The method of claim 22, said step of mechanically exciting further comprising:
  mechanically exciting the chemical reaction products at at least one frequency higher than approximately 3.26 MHz.

24. The method of claim 1, further comprising the steps of:
  sweeping said mechanical excitations, during at least part of a time while the energy storage device (10) is discharged, through a discharge cycle plurality of frequencies proximate resonant frequencies of said covalent bonds;
  sweeping said mechanical excitations, during at least part of a time while the energy storage device (10) is charged, through a charge cycle plurality of frequencies proximate resonant frequencies of said covalent bonds; and
  sweeping said charge cycle plurality of frequencies through at least one frequency higher than a highest frequency of said discharge cycle plurality of frequencies.

25. The method of claim 24:
  the energy storage device (10) comprising a lead-acid battery; and
  said step of mechanically exciting further comprising mechanically exciting the chemical reaction products at frequencies comprising approximately 3.26 MHz.

26. The method of claim 1:
  said active material (31) comprising lead zirconate titanate (PZT).

27. The method of claim 1:
  said active material (31) comprising lead zirconate.

28. The method of claim 1:
  said active material (31) comprising lead titanate.

29. The method of claim 1, further comprising the step of:
  providing said active material (31) substantially contained within at least one electrode comprising said matrix (51).

30. The method of claim 1, further comprising the step of:
  doping at least one electrode of said matrix (51) with a doping material comprising said active material (31).

31. The method of claim 30:
  said doping material comprising zirconate.

32. The method of claim 30:
  said doping material comprising titanate.

33. The method of claim 1, further comprising the step of:
  providing said active material (31) in mechanical connection with at least one electrode of said matrix (51).

34. The method of claim 33:
  said active material (31) comprising zirconate.

35. The method of claim 33:
  said active material (31) comprising titanate.

36. The method of claim 1, further comprising the step of:
  providing an electrolyte of the energy storage device (10) comprising said active material (31).

37. The method of claim 36:
  said active material (31) comprising zirconate.

38. The method of claim 36:
  said active material (31) comprising titanate.

39. The method of claim 1, further comprising the step of:
  providing a separator of the energy storage device (10) comprising said active material (31).

40. The method of claim 39:
  said active material (31) comprising zirconate.

41. The method of claim 39:
  said active material (31) comprising titanate.

42. The method of claim 1, further comprising the step of:
  providing a casting of the energy storage device (10) comprising said active material (31).

43. The method of claim 42:
  said active material (31) comprising zirconate.

44. The method of claim 42:
said active material (31) comprising titanate.

45. The method of claim 1, further comprising the step of:
providing said active material (31) external to and in mechanical connection with the energy storage device (10).

46. The method of claim 1, further comprising the step of:
providing said active material (31) in mechanical connection with at least one terminal of the energy storage device (10).

47. The method of claim 1:
said active material (31) comprising magneto-responsive material responsive to magnetic fields; and
said electromagnetic signal comprising a magnetic field; said step of introducing said mechanical excitations further comprising:
introducing said mechanical excitations via said magneto-responsive material, in response to said magnetic field.

48. The method of claim 47, further comprising the step of:
providing an electrolyte of the energy storage device (10) comprising said magneto-responsive material.

49. The method of claim 1:
said active material (31) comprising electrostrictive material responsive to electrical signals; and
said electromagnetic signal comprising an electrical signal; said step of introducing said mechanical excitations further comprising:
introducing said mechanical excitations via said electrostrictive material, in response to said electrical signal.

50. The method of claim 1:
said active material (31) comprising magnetostrictive material responsive to magnetic fields; and
said electromagnetic signal comprising a magnetic field; said step of introducing said mechanical excitations further comprising:
introducing said mechanical excitations via said magnetostrictive material in response to said magnetic field.

51. The method of claim 1:
said electromagnetic signal comprising an electrical current comprising non-DC components.

52. The method of claim 51, further comprising the step of:
applying said non-DC components across an electrical potential of the energy storage device (10).

53. The method of claim 51, further comprising the step of:
inducing said non-DC components via magnetic induction.

54. The method of claim 1, further comprising the steps of:
electrically exciting, in addition to said mechanically exciting, the chemical reaction products within the energy storage device (10) at said energy levels proximate which covalent bonds with the matrix (51) of the energy storage device (10) would form absent excitation, thereby further substantially maintaining ionic bonding between the chemical reaction products and further substantially preventing the chemical reaction products from forming covalent bonds with the matrix (51); and
introducing the electrical excitations into the energy storage device (10) via an electric current comprising non-DC components, in addition to said electromagnetic signal.

55. The method of claim 54, said step of introducing said electrical excitations further comprising:
applying said non-DC components across an electrical potential of the energy storage device (10).

56. The method of claim 54, said step of introducing said electrical excitations further comprising:
inducing said non-DC components via magnetic induction.

57. The method of claim 54, said step of electrically exciting comprising:
electrically oscillating the chemical reaction products at a predetermined periodic oscillation frequency.

58. The method of claim 54, said step of electrically exciting comprising:
electrically pulsing the chemical reaction products with a pulse of a predetermined rise time.

59. The method of claim 1, further comprising the steps of:
electrically exciting, in addition to mechanically exciting, the chemical reaction products within the energy storage device (10) at energy levels suitable for substantially breaking the ionic bonds between the chemical reaction products and the matrix (51) and causing the chemical reaction products to substantially return to an electrolyte of the energy storage device (10), thereby substantially breaking the ionic bonds between the chemical reaction products and the matrix (51) and causing the chemical reaction products to substantially return to an electrolyte of the energy storage device (10); and
introducing the electrical excitations into the energy storage device (10) via an electric current comprising non-DC components, in addition to said electromagnetic signal.

60. The method of claim 59, said step of introducing said electrical excitations further comprising:
applying said non-DC components across an electrical potential of the energy storage device (10).

61. The method of claim 59, said step of introducing said electrical excitations further comprising:
inducing said non-DC components via magnetic induction.

62. The method of claim 59, said step of electrically exciting comprising:
electrically oscillating the chemical reaction products at a predetermined periodic oscillation frequency.

63. The method of claim 59, said step of electrically exciting comprising:
electrically pulsing the chemical reaction products with a pulse of a predetermined rise time.

64. The method of claim 54:
said step of introducing said mechanical excitations further comprising introducing said mechanical excitations during at least part of a time while the energy storage device (10) is charged; and
said step of introducing the electrical excitations further comprising introducing said non-DC components during at least part of a time while the energy storage device (10) is discharged.

65. The method of claim 55:
said step of introducing said mechanical excitations further comprising introducing said mechanical excitations during at least part of a time while the energy storage device (10) is charged; and
said step of introducing the electrical excitations further comprising introducing said non-DC components during at least part of a time while the energy storage device (10) is discharged.

66. The method of claim 59:
said step of introducing said mechanical excitations further comprising introducing said mechanical excitations during at least part of a time while the energy storage device (10) is discharged; and
said step of introducing the electrical excitations further comprising introducing said non-DC components during at least part of a time while the energy storage device (10) is charged.

67. The method of claim 60, further comprising:
said step of introducing said mechanical excitations further comprising introducing said mechanical excitations during at least part of a time while the energy storage device (10) is discharged; and
said step of introducing the electrical excitations further comprising introducing said non-DC components during at least part of a time while the energy storage device (10) is charged.

68. The method of claim 1, further comprising the steps of:
providing electrical power from said energy storage device (10) to a motor vehicle; and
receiving electrical power into said energy storage device (10) from said motor vehicle.

69. The method of claim 1, further comprising the step of:
powering a load using hybridized energy from a supplemental source of energy in addition to energy from said energy storage device (10), in varying proportions responsive to varying operating conditions.

70. The method of claim 1, further comprising the steps of:
receiving electrical power into said energy storage device (10) from a power generation and distribution system;
supplying electrical power from said energy storage device (10) into said power generation and distribution system; and
load balancing said receiving and supplying of electrical power from and into said power generation and distribution system, in response to varying operating conditions.

71. A method for improving energy performance and substantially preventing degradation of a chemical-to-electrical energy conversion process of an energy storage device (10), comprising the steps of:
mechanically exciting an energy storage device (10) at frequencies proximate resonant frequencies at which chemical covalent bonds between chemical reaction products and a matrix (51), i.e., electrode material of the energy storage device (10) would form absent excitation; and
introducing the mechanical excitations into the energy storage device (10) via an active material (31) mechanically-responsive to electromagnetic signals, in response to an electromagnetic signal.

72. The method of claim 71, said step of mechanically exciting comprising:
mechanically vibrating the chemical reaction products at a predetermined periodic oscillation frequency.

73. The method of claim 71, said step of mechanically exciting comprising:
mechanically pulsing the chemical reaction products with a pulse of a predetermined rise time.

74. The method of claim 71, said step of mechanically exciting further comprising:
mechanically exciting the chemical reaction products to a frequency proximate a lowest resonant frequency of said covalent bonds.

75. The method of claim 71, said step of mechanically exciting further comprising:
mechanically exciting the chemical reaction products to a frequency proximate a resonant frequency of said covalent bonds higher than a lowest resonant frequency of said covalent bonds.

76. The method of claim 71, said step of mechanically exciting further comprising:
mechanically exciting the chemical reaction products to a frequency proximate a lowest resonant frequency of said covalent bonds; and
mechanically exciting the chemical reaction products to a frequency proximate a higher resonant frequency of said covalent bonds.

77. The method of claim 71, further comprising the step of:
powering said step of the introducing said mechanical excitations into the energy storage device (10), using at least some electrical power from the energy storage device (10).

78. The method of claim 71:
the matrix (51) comprising lead (Pb);
the chemical reaction products comprising sulfate ($SO_4$); and
the covalent bonds comprising lead sulfate ($PbSO_4$) covalent bonds.

79. The method of claim 78, said step of mechanically exciting further comprising:
mechanically exciting the chemical reaction products at frequencies comprising approximately 3.26 MHz.

80. The method of claim 79, said step of mechanically exciting further comprising:
mechanically exciting the chemical reaction products at at least one frequency higher than approximately 3.26 MHz.

81. The method of claim 71:
the matrix (51) comprising NiO and MH;
the chemical reaction products comprising $(OH)_2$; and
the covalent bonds comprising $Ni(OH)_2$ covalent bonds.

82. The method of claim 71:
the matrix (51) comprising Cd and NiO;
the chemical reaction products comprising $(OH)_2$; and
the covalent bonds comprising $Cd(OH)_2$ and $Ni(OH)_2$ covalent bonds.

83. The method of claim 71:
the matrix (51) comprising Li and another alloy X;
the chemical reaction products comprising $XO_2$; and
the covalent bonds comprising $LiXO_2$ covalent bonds.

84. The method of claim 71, said step of introducing said mechanical excitations further comprising:
introducing said mechanical excitations during at least part of a time while the energy storage device (10) is discharged.

85. The method of claim 71, said step of introducing said mechanical excitations further comprising:
introducing said mechanical excitations during at least part of a time while the energy storage device (10) is charged.

86. The method of claim 71, said step of introducing said mechanical excitations further comprising:
introducing said mechanical excitations during at least part of a time while the energy storage device (10) is discharged; and
introducing said mechanical excitations during at least part of a time while the energy storage device (10) is charged.

87. The method of claim 71, said step of introducing said mechanical excitations further comprising:
introducing said mechanical excitations during at least part of a time while the energy storage device (10) is discharged; and
introducing said mechanical excitations during at least part of the time while the energy storage device (10) is discharged at said frequencies proximate said resonant frequencies.

88. The method of claim 71, said step of introducing said mechanical excitations further comprising:
introducing said mechanical excitations during at least part of a time while the energy storage device (10) is charged; and introducing said mechanical excitations during at least part of the time while the energy storage device (10) is charged at at least one frequency higher than said resonant frequencies.

89. The method of claim 71, said step of introducing said mechanical excitations further comprising:
   introducing said mechanical excitations during at least part of a time while the energy storage device (10) is discharged;
   introducing said mechanical excitations during at least part of the time while the energy storage device (10) is discharged at said frequencies proximate said resonant frequencies;
   introducing said mechanical excitations during at least part of a time while the energy storage device (10) is charged; and
   introducing said mechanical excitations during at least part of the time while the energy storage device (10) is charged at at least one frequency higher than said resonant frequencies.

90. The method of claim 71, further comprising the step of:
   sweeping said mechanical excitations through a plurality of said frequencies proximate said resonant frequencies.

91. The method of claim 71, further comprising the steps of:
   sweeping said mechanical excitations, during at least part of a time while the energy storage device (10) is discharged, through a discharge cycle plurality of frequencies proximate said resonant frequencies;
   sweeping said mechanical excitations, during at least part of a time while the energy storage device (10) is charged, through a charge cycle plurality of frequencies proximate said resonant frequencies; and
   sweeping said charge cycle plurality of energy levels through at least one frequency higher than a highest frequency of said discharge cycle plurality of frequencies.

92. The method of claim 89:
   the energy storage device (10) comprising a lead-acid battery; and
   said step of mechanically exciting further comprising mechanically exciting the chemical reaction products at frequencies comprising approximately 3.26 MHz.

93. The method of claim 92, said step of mechanically exciting further comprising:
   mechanically exciting the chemical reaction products at least one frequency higher than approximately 3.26 MHz.

94. The method of claim 71, further comprising the steps of:
   sweeping said mechanical excitations, during at least part of a time while the energy storage device (10) is discharged, through a discharge cycle plurality of energy levels proximate energy levels of said covalent bonds;
   sweeping said mechanical excitations, during at least part of a time while the energy storage device (10) is charged, through a charge cycle plurality of energy levels proximate energy levels of said covalent bonds; and
   sweeping said charge cycle plurality of energy levels through at least one energy level higher than a highest energy level of said discharge cycle plurality of energy levels.

95. The method of claim 91:
   the energy storage device (10) comprising a lead-acid battery; and said step of mechanically exciting further comprising mechanically exciting the chemical reaction products at frequencies comprising approximately 3.26 MHz.

96. The method of claim 71:
   said active material (31) comprising lead zirconate titanate (PZT).

97. The method of claim 71:
   said active material (31) comprising lead zirconate.

98. The method of claim 71:
   said active material (31) comprising lead titanate.

99. The method of claim 71, further comprising the step of:
   providing said active material (31) substantially contained within at least one electrode comprising said matrix (51).

100. The method of claim 71, further comprising the step of:
   doping at least one electrode of said matrix (51) with a doping material comprising said active material (31).

101. The method of claim 100:
   said doping material comprising zirconate.

102. The method of claim 100:
   said doping material comprising titanate.

103. The method of claim 71, further comprising the step of:
   providing said active material (31) in mechanical connection with at least one electrode of said matrix (51).

104. The method of claim 103:
   said active material (31) comprising zirconate.

105. The method of claim 103:
   said active material (31) comprising titanate.

106. The method of claim 71, further comprising the step of:
   providing an electrolyte of the energy storage device (10) comprising said active material (31).

107. The method of claim 106:
   said active material (31) comprising zirconate.

108. The method of claim 106:
   said active material (31) comprising titanate.

109. The method of claim 71, further comprising the step of:
   providing a separator of the energy storage device (10) comprising said active material (31).

110. The method of claim 109:
   said active material (31) comprising zirconate.

111. The method of claim 109:
   said active material (31) comprising titanate.

112. The method of claim 71, further comprising the step of:
   providing a casting of the energy storage device (10) comprising said active material (31).

113. The method of claim 112:
   said active material (31) comprising zirconate.

114. The method of claim 112:
   said active material (31) comprising titanate.

115. The method of claim 71, further comprising the step of:
   providing said active material (31) external to and in mechanical connection with the energy storage device (10).

116. The method of claim 71, further comprising the step of:
   providing said active material (31) in mechanical connection with at least one terminal of the energy storage device (10).

117. The method of claim 71:
   said active material (31) comprising magneto-responsive material responsive to magnetic fields; and said electromagnetic signal comprising a magnetic field;
said step of introducing said mechanical excitations further comprising:
introducing said mechanical excitations via said magneto-responsive material, in response to said magnetic field.

118. The method of claim 117, further comprising the step of:
providing an electrolyte of the energy storage device (10) comprising said magneto-responsive material.

119. The method of claim 71:
said active material (31) comprising electrostrictive material responsive to electrical signals; and
said electromagnetic signal comprising an electrical signal; said step of introducing said mechanical excitations further comprising:
introducing said mechanical excitations via said electrostrictive material, in response to said electrical signal.

120. The method of claim 71:
said active material (31) comprising magnetostrictive material responsive to magnetic fields; and
said electromagnetic signal comprising a magnetic field; said step of introducing said mechanical excitations further comprising:
introducing said mechanical excitations via said magnetostrictive material in response to said magnetic field.

121. The method of claim 71:
said electromagnetic signal comprising an electrical current comprising non-DC components.

122. The method of claim 121, further comprising the step of:
applying said non-DC components across an electrical potential of the energy storage device (10).

123. The method of claim 121, further comprising the step of:
inducing said non-DC components via magnetic induction.

124. The method of claim 71, further comprising the steps of:
electrically exciting, in addition to said mechanically exciting, the energy storage device (10) at frequencies proximate said resonant frequencies; and
introducing the electrical excitations into the energy storage device (10) via an electric current comprising non-DC components, in addition to said electromagnetic signal.

125. The method of claim 124, said step of introducing said electrical excitations further comprising:
applying said non-DC components across an electrical potential of the energy storage device (10).

126. The method of claim 124, said step of introducing said electrical excitations further comprising:
inducing said non-DC components via magnetic induction.

127. The method of claim 124, said step of electrically exciting comprising:
electrically oscillating the chemical reaction products at a predetermined periodic oscillation frequency.

128. The method of claim 124, said step of electrically exciting comprising:
electrically pulsing the chemical reaction products with a pulse of a predetermined rise time.

129. The method of claim 71, further comprising the steps of:
electrically exciting, in addition to said mechanically exciting, the energy storage device (10), at at least one frequency higher than said resonant frequencies; and
introducing the electrical excitations into the energy storage device (10) via an electric current comprising non-DC components, in addition to said electromagnetic signal.

130. The method of claim 129, said step of introducing said electrical excitations further comprising:
applying said non-DC components across an electrical potential of the energy storage device (10).

131. The method of claim 129, said step of introducing said electrical excitations further comprising:
inducing said non-DC components via magnetic induction.

132. The method of claim 129, said step of electrically exciting comprising:
electrically oscillating the chemical reaction products at a predetermined periodic oscillation frequency.

133. The method of claim 129, said step of electrically exciting comprising:
electrically pulsing the chemical reaction products with a pulse of a predetermined rise time.

134. The method of claim 124:
said step of introducing said mechanical excitations further comprising introducing said mechanical excitations during at least part of a time while the energy storage device (10) is charged; and
said step of introducing the electrical excitations further comprising introducing said non-DC components during at least part of a time while the energy storage device (10) is discharged.

135. The method of claim 125:
said step of introducing said mechanical excitations further comprising introducing said mechanical excitations during at least part of a time while the energy storage device (10) is charged; and
said step of introducing the electrical excitations further comprising introducing said non-DC components during at least part of a time while the energy storage device (10) is discharged.

136. The method of claim 129:
said step of introducing said mechanical excitations further comprising introducing said mechanical excitations during at least part of a time while the energy storage device (10) is discharged; and
said step of introducing the electrical excitations further comprising introducing said non-DC components during at least part of a time while the energy storage device (10) is charged.

137. The method of claim 130, further comprising:
said step of introducing said mechanical excitations further comprising introducing said mechanical excitations during at least part of a time while the energy storage device (10) is discharged; and
said step of introducing the electrical excitations further comprising introducing said non-DC components during at least part of a time while the energy storage device (10) is charged.

138. The method of claim 71, further comprising the steps of:
providing electrical power from said energy storage device (10) to a motor vehicle; and
receiving electrical power into said energy storage device (10) from said motor vehicle.

139. The method of claim 71, further comprising the step of:
powering a load using hybridized energy from a supplemental source of energy in addition to energy from said energy storage device (10), in varying proportions responsive to varying operating conditions.

140. The method of claim 71, further comprising the steps of:
- receiving electrical power into said energy storage device (10) from a power generation and distribution system;
- supplying electrical power from said energy storage device (10) into said power generation and distribution system; and
- load balancing said receiving and supplying of electrical power from and into said power generation and distribution system, in response to varying operating conditions.

141. An energy storage device (10) which substantially improves energy performance and prevents degradation of its chemical-to-electrical energy conversion process, comprising:
- an active material (31) mechanically-responsive to electromagnetic signals for introducing mechanical excitations into the energy storage device (10) in response to an electromagnetic signal and thereby exciting chemical reaction products within the energy storage device (10) at energy levels proximate which chemical covalent bonds with a matrix (51), i.e., electrode material of the energy storage device (10) would form absent excitation; wherein:
- said mechanical excitations substantially maintain ionic bonds between the chemical reaction products and the matrix (51) and substantially prevent the chemical reaction products from forming covalent bonds with the matrix (51); whereby:
- degradation is substantially prevented because the covalent bonds are substantially prevented from forming and because the energy storage device (10) is excited mechanically rather than via degrading electrical excitation; and
- energy performance is improved because lower amounts of energy are required to excite the chemical reaction products via said active material (31) than would be required to achieve similar excitations without said active material (31), and because covalent bonds are substantially prevented from forming and causing degradation.

142. The device of claim 141, said mechanical excitations comprising:
- mechanical vibrations vibrating the chemical reaction products at a predetermined periodic oscillation frequency.

143. The device of claim 141, said mechanical excitations comprising:
- mechanical pulses pulsing the chemical reaction products with a pulse of a predetermined rise time.

144. The device of claim 141, said mechanical excitations exciting the chemical reaction products to an energy level proximate a lowest-energy level of said covalent bonds.

145. The device of claim 141, said mechanical excitations exciting the chemical reaction products to an energy level proximate a higher-energy level of said covalent bonds.

146. The device of claim 141, said mechanical excitations:
- exciting the chemical reaction products to an energy level proximate a lowest-energy level of said covalent bonds; and
- exciting the chemical reaction products to a higher energy level proximate a higher-energy level of said covalent bonds.

147. The device of claim 141, further comprising:
- at least some electrical power from the energy storage device (10), used to power the introduction of said mechanical excitations into the energy storage device (10).

148. The device of claim 141:
- the matrix (51) comprising lead (Pb);
- the chemical reaction products comprising sulfate ($SO_4$); and
- the covalent bonds comprising lead sulfate ($PbSO_4$) covalent bonds.

149. The device of claim 148, said mechanical excitations comprising a frequency of approximately 3.26 MHz.

150. The device of claim 149, said mechanical excitations further comprising at least one frequency higher than approximately 3.26 MHz.

151. The device of claim 141:
- the matrix (51) comprising NiO and MH;
- the chemical reaction products comprising $(OH)_2$; and
- the covalent bonds comprising $Ni(OH)_2$ covalent bonds.

152. The device of claim 141:
- the matrix (51) comprising Cd and NiO;
- the chemical reaction products comprising $(OH)_2$; and
- the covalent bonds comprising $Cd(OH)_2$ and $Ni(OH)_2$ covalent bonds.

153. The device of claim 141:
- the matrix (51) comprising Li and another alloy X;
- the chemical reaction products comprising $XO_2$; and
- the covalent bonds comprising $LiXO_2$ covalent bonds.

154. The device of claim 141, further comprising:
- a control module causing said mechanical excitations to be introduced during at least part of a time while the energy storage device (10) is discharged.

155. The device of claim 141, further comprising:
- a control module causing said mechanical excitations to be introduced during at least part of a time while the energy storage device (10) is charged.

156. The device of claim 141, further comprising:
- a control module causing said mechanical excitations to be introduced during at least part of a time while the energy storage device (10) is discharged and during at least part of a time while the energy storage device (10) is charged.

157. The device of claim 141, further comprising:
- a control module causing said mechanical excitations, during at least part of a time while the energy storage device (10) is discharged, to be introduced at said energy levels which substantially maintain the ionic bonds between the chemical reaction products and the matrix (51).

158. The device of claim 141, further comprising:
- a control module causing said mechanical excitations, during at least part of a time while the energy storage device (10) is charged, to be introduced at energy levels which substantially break the ionic bonds between the chemical reaction products and the matrix (51) and cause the chemical reaction products to return to an electrolyte of the energy storage device (10).

159. The device of claim 141, further comprising:
- a control module causing said mechanical excitations, during at least part of a time while the energy storage device (10) is discharged, to be introduced at said energy levels which substantially maintain the ionic bonds between the chemical reaction products and the matrix (51); and
- said control module causing said mechanical excitations, during at least part of a time while the energy storage device (10) is charged, to be introduced at energy levels which substantially break the ionic bonds between the chemical reaction products and the matrix (51) and cause the chemical reaction products to substantially return to an electrolyte of the energy storage device (10).

160. The device of claim 141, further comprising:
a control module causing said mechanical excitations to sweep through a plurality of said energy levels proximate energy levels of said covalent bonds.

161. The device of claim 141, further comprising:
a control module causing said mechanical excitations, during at least part of a time while the energy storage device (10) is discharged, to sweep through a discharge cycle plurality of energy levels proximate energy levels of said covalent bonds;
said control module causing said mechanical excitations, during at least part of a time while the energy storage device (10) is charged, to sweep through a charge cycle plurality of energy levels proximate energy levels of said covalent bonds; and
said charge cycle plurality of energy levels comprising at least one energy level higher than a highest energy level of said discharge cycle plurality of energy levels.

162. The device of claim 159:
the energy storage device (10) comprising a lead-acid battery; and
said mechanical excitations comprising a frequency of approximately 3.26 MHz.

163. The device of claim 162, said mechanical excitations further comprising at least one frequency higher than approximately 3.26 MHz.

164. The device of claim 141, further comprising:
a control module causing said mechanical excitations, during at least part of a time while the energy storage device (10) is discharged, to sweep through a discharge cycle plurality of frequencies proximate resonant frequencies of said covalent bonds; and
said control module causing said mechanical excitations, during at least part of a time while the energy storage device (10) is charged, to sweep through a charge cycle plurality of frequencies proximate resonant frequencies of said covalent bonds; and
said charge cycle plurality of frequencies comprising at least one frequency higher than a highest frequency of said discharge cycle plurality of frequencies.

165. The device of claim 164:
the energy storage device (10) comprising a lead-acid battery; and
said mechanical excitations comprising a frequency of approximately 3.26 MHz.

166. The device of claim 141:
said active material (31) comprising lead zirconate titanate (PZT).

167. The device of claim 141:
said active material (31) comprising lead zirconate.

168. The device of claim 141:
said active material (31) comprising lead titanate.

169. The device of claim 141, further comprising:
at least one electrode comprising said matrix (51) substantially containing said active material (31).

170. The device of claim 141, further comprising:
at least one electrode of said matrix (51) doped with a doping material comprising said active material (31).

171. The device of claim 170:
said doping material comprising zirconate.

172. The device of claim 170:
said doping material comprising titanate.

173. The device of claim 141, further comprising:
at least one electrode of said matrix (51) comprising said active material (31) in mechanical connection therewith.

174. The device of claim 173:
said active material (31) comprising zirconate.

175. The device of claim 173:
said active material (31) comprising titanate.

176. The device of claim 141, further comprising:
an electrolyte of the energy storage device (10) comprising said active material (31).

177. The device of claim 176:
said active material (31) comprising zirconate.

178. The device of claim 176:
said active material (31) comprising titanate.

179. The device of claim 141, further comprising:
a separator of the energy storage device (10) comprising said active material (31).

180. The device of claim 179:
said active material (31) comprising zirconate.

181. The device of claim 179:
said active material (31) comprising titanate.

182. The device of claim 141, further comprising:
a casting of the energy storage device (10) comprising said active material (31).

183. The device of claim 182:
said active material (31) comprising zirconate.

184. The device of claim 182:
said active material (31) comprising titanate.

185. The device of claim 141, further comprising:
said active material (31) external to and in mechanical connection with the energy storage device (10).

186. The device of claim 141, further comprising:
said active material (31) in mechanical connection with at least one terminal of the energy storage device (10).

187. The device of claim 141, further comprising:
said active material (31) comprising magneto-responsive material responsive to magnetic fields; and
said electromagnetic signal comprising a magnetic field; wherein:
said magneto-responsive material introduces said mechanical excitations in response to said magnetic field.

188. The device of claim 187, further comprising:
an electrolyte of the energy storage device (10) comprising said magneto-responsive material.

189. The device of claim 141, further comprising:
said active material (31) comprising electrostrictive material responsive to electrical signals; and
said electromagnetic signal comprising an electrical signal; wherein:
said electrostrictive material introduces said mechanical excitations in response to said electrical signal.

190. The device of claim 141, further comprising:
said active material (31) comprising magnetostrictive material responsive to magnetic fields; and
said electromagnetic signal comprising a magnetic field; wherein:
said magnetostrictive material introduces said mechanical excitations in response to said magnetic field.

191. The device of claim 141, further comprising:
said electromagnetic signal comprising an electrical current comprising non-DC components.

192. The device of claim 191, wherein:
said non-DC components are introduced into the energy storage device (10) by being applied across an electrical potential of the energy storage device (10).

193. The device of claim 191, wherein:
said non-DC components are introduced into the energy storage device (10) via magnetic induction.

194. The device of claim 141, further comprising:
an electric current comprising non-DC components, in addition to said electromagnetic signal, introducing electrical excitations into the energy storage device (10), in addition to said mechanical excitations, electrically exciting the chemical reaction products within the energy storage device (10) at said energy levels proximate which covalent bonds with the matrix (51) of the energy storage device (10) would form absent excitation; wherein:

said non-DC components further substantially maintain ionic bonds between the chemical reaction products and the matrix (51) and substantially prevent the chemical reaction products from forming covalent bonds with the matrix (51).

195. The device of claim 194, wherein:

said non-DC components are introduced into the energy storage device (10) by being applied across an electrical potential of the energy storage device (10).

196. The device of claim 194, wherein:

said non-DC components are introduced into the energy storage device (10) via magnetic induction.

197. The device of claim 194, said electrical excitations comprising:

electrical oscillations oscillating the chemical reaction products at a predetermined periodic oscillation frequency.

198. The device of claim 194, said electrical excitations comprising:

electrical pulses pulsing the chemical reaction products with a pulse of a predetermined rise time.

199. The device of claim 141, further comprising:

an electric current comprising non-DC components, in addition to said electromagnetic signal, introducing electrical excitations into the energy storage device (10), in addition to said mechanical excitations, electrically exciting the chemical reaction products within the energy storage device (10) at energy levels suitable for substantially breaking the ionic bonds between the chemical reaction products and the matrix (51) and causing the chemical reaction products to substantially return to an electrolyte of the energy storage device (10); wherein:

said non-DC components substantially break the ionic bonds between the chemical reaction products and the matrix (51) and cause the chemical reaction products to substantially return to an electrolyte of the energy storage device (10).

200. The device of claim 199, wherein:

said non-DC components are introduced into the energy storage device (10) by being applied across an electrical potential of the energy storage device (10).

201. The device of claim 199, wherein:

said non-DC components are introduced into the energy storage device (10) via magnetic induction.

202. The device of claim 199, said electrical excitations comprising:

electrical oscillations oscillating the chemical reaction products at a predetermined periodic oscillation frequency.

203. The device of claim 199, said electrical excitations comprising:

electrical pulses pulsing the chemical reaction products with a pulse of a predetermined rise time.

204. The device of claim 194, further comprising:

a control module causing said mechanical excitations to be introduced during at least part of a time while the energy storage device (10) is charged; and said control module causing said non-DC components to be introduced during at least part of a time while the energy storage device (10) is discharged.

205. The device of claim 195, further comprising:

a control module causing said mechanical excitations to be introduced during at least part of a time while the energy storage device (10) is charged; and said control module causing said non-DC components to be applied across the electrical potential during at least part of a time while the energy storage device (10) is discharged.

206. The device of claim 199, further comprising:

a control module causing said mechanical excitations to be introduced during at least part of a time while the energy storage device (10) is discharged; and said control module causing said non-DC components to be introduced during at least part of a time while the energy storage device (10) is charged.

207. The device of claim 200, further comprising:

a control module causing said mechanical excitations to be introduced during at least part of a time while the energy storage device (10) is discharged; and said control module causing said non-DC components to be applied across the electrical potential during at least part of a time while the energy storage device (10) is charged.

208. The device of claim 141, further comprising:

electrical power from said energy storage device (10) provided to a motor vehicle; and electrical power received into said energy storage device (10) from said motor vehicle.

209. The device of claim 141, further comprising:

a hybridizer causing energy from a supplemental source of energy in addition to energy from said energy storage device (10), in varying proportions responsive to varying operating conditions, to power a load.

210. The device of claim 141, further comprising:

an electrical connection between said energy storage device (10) and a power generation and distribution system enabling said energy storage device (10) to receive electrical power from said power generation and distribution system;

said electrical connection further enabling said energy storage device (10) to supply electrical power into said power generation and distribution system; and a load balancer causing said energy storage device (10) to receive and supply said electrical power from and into said power generation and distribution system, in response to varying operating conditions.

211. An energy storage device (10) which substantially improves energy performance and prevents degradation of its chemical-to-electrical energy conversion process, comprising:

an active material (31) mechanically-responsive to electromagnetic signals for introducing mechanical excitations into the energy storage device (10) in response to an electromagnetic signal, at frequencies proximate resonant frequencies at which chemical covalent bonds between chemical reaction products and a matrix (51), i.e., electrode material of the energy storage device (10) would form absent excitation.

212. The device of claim 211, said mechanical excitations comprising:

mechanical vibrations vibrating the chemical reaction products at a predetermined periodic oscillation frequency.

213. The device of claim 211, said mechanical excitations comprising:
mechanical pulses pulsing the chemical reaction products with a pulse of a predetermined rise time.

214. The device of claim 211, said mechanical excitations exciting the chemical reaction products to a frequency proximate a lowest resonant frequency of said covalent bonds.

215. The device of claim 211, said mechanical excitations exciting the chemical reaction products to a frequency proximate a resonant frequency of said covalent bonds higher than a lowest resonant frequency of said covalent bonds.

216. The device of claim 211, said mechanical excitations:
exciting the chemical reaction products to a frequency proximate a lowest resonant frequency of said covalent bonds; and
exciting the chemical reaction products to a frequency proximate a higher resonant frequency of said covalent bonds.

217. The device of claim 211, further comprising:
at least some electrical power from the energy storage device (10), used to power the introduction of said mechanical excitations into the energy storage device (10).

218. The device of claim 211:
the matrix (51) comprising lead (Pb);
the chemical reaction products comprising sulfate ($SO_4$); and
the covalent bonds comprising lead sulfate ($PbSO_4$) covalent bonds.

219. The device of claim 218, said mechanical excitations comprising a frequency of approximately 3.26 MHz.

220. The device of claim 219, said mechanical excitations further comprising at least one frequency higher than approximately 3.26 MHz.

221. The device of claim 211:
the matrix (51) comprising NiO and MH;
the chemical reaction products comprising $(OH)_2$; and
the covalent bonds comprising $Ni(OH)_2$ covalent bonds.

222. The device of claim 211:
the matrix (51) comprising Cd and NiO;
the chemical reaction products comprising $(OH)_2$; and
the covalent bonds comprising $Cd(OH)_2$ and $Ni(OH)_2$ covalent bonds.

223. The device of claim 211:
the matrix (51) comprising Li and another alloy X;
the chemical reaction products comprising $XO_2$; and
the covalent bonds comprising $LiXO_2$ covalent bonds.

224. The device of claim 211, further comprising:
a control module causing said mechanical excitations to be introduced during at least part of a time while the energy storage device (10) is discharged.

225. The device of claim 211, further comprising:
a control module causing said mechanical excitations to be introduced during at least part of a time while the energy storage device (10) is charged.

226. The device of claim 211, further comprising:
a control module causing said mechanical excitations to be introduced during at least part of a time while the energy storage device (10) is discharged and during at least part of a time while the energy storage device (10) is charged.

227. The device of claim 211, further comprising:
a control module causing said mechanical excitations, during at least part of a time while the energy storage device (10) is discharged, to be introduced at said frequencies proximate said resonant frequencies.

228. The device of claim 211, further comprising:
a control module causing said mechanical excitations, during at least part of a time while the energy storage device (10) is charged, to be introduced at to be introduced at at least one frequency higher than said resonant frequencies.

229. The device of claim 211, further comprising:
a control module causing said mechanical excitations, during at least part of a time while the energy storage device (10) is discharged, to be introduced at said frequencies proximate said resonant frequencies; and
said control module causing said mechanical excitations, during at least part of a time while the energy storage device (10) is charged, to be introduced at to be introduced at at least one frequency higher than said resonant frequencies.

230. The device of claim 211, further comprising:
a control module causing said mechanical excitations to sweep through a plurality of said frequencies proximate said resonant frequencies.

231. The device of claim 211, further comprising:
a control module causing said mechanical excitations, during at least part of a time while the energy storage device (10) is discharged, to sweep through a discharge cycle plurality of frequencies proximate said resonant frequencies;
said control module causing said mechanical excitations, during at least part of a time while the energy storage device (10) is charged, to sweep through a charge cycle plurality of frequencies proximate said resonant frequencies; and
said charge cycle plurality of frequencies comprising at least one frequency higher than a highest frequency of said discharge cycle plurality of frequencies.

232. The device of claim 229:
the energy storage device (10) comprising a lead-acid battery; and
said mechanical excitations comprising a frequency of approximately 3.26 MHz.

233. The device of claim 232, said mechanical excitations further comprising at least one frequency higher than approximately 3.26 MHz.

234. The device of claim 211, further comprising:
a control module causing said mechanical excitations, during at least part of a time while the energy storage device (10) is discharged, to sweep through a discharge cycle plurality of energy levels proximate energy levels of said covalent bonds;
said control module causing said mechanical excitations, during at least part of a time while the energy storage device (10) is charged, to sweep through a charge cycle plurality of energy levels proximate energy levels of said covalent bonds; and
said charge cycle plurality of energy levels comprising at least one energy level higher than a highest energy level of said discharge cycle plurality of energy levels.

235. The device of claim 231:
the energy storage device (10) comprising a lead-acid battery; and
said mechanical excitations comprising a frequency of approximately 3.26 MHz.

236. The device of claim 211:
said active material (31) comprising lead zirconate titanate (PZT).

237. The device of claim 211:
said active material (31) comprising lead zirconate.

238. The device of claim 211:
said active material (31) comprising lead titanate.

239. The device of claim 211, further comprising:
at least one electrode comprising said matrix (51) substantially containing said active material (31).

240. The device of claim 211, further comprising:
at least one electrode of said matrix (51) doped with a doping material comprising said active material (31).

241. The device of claim 240:
said doping material comprising zirconate.

242. The device of claim 240:
said doping material comprising titanate.

243. The device of claim 211, further comprising:
at least one electrode of said matrix (51) comprising said active material (31) in mechanical connection therewith.

244. The device of claim 243:
said active material (31) comprising zirconate.

245. The device of claim 243:
said active material (31) comprising titanate.

246. The device of claim 211, further comprising:
an electrolyte of the energy storage device (10) comprising said active material (31).

247. The device of claim 246:
said active material (31) comprising zirconate.

248. The device of claim 246:
said active material (31) comprising titanate.

249. The device of claim 211, further comprising:
a separator of the energy storage device (10) comprising said active material (31).

250. The device of claim 249:
said active material (31) comprising zirconate.

251. The device of claim 249:
said active material (31) comprising titanate.

252. The device of claim 211, further comprising:
a casting of the energy storage device (10) comprising said active material (31).

253. The device of claim 252:
said active material (31) comprising zirconate.

254. The device of claim 252:
said active material (31) comprising titanate.

255. The device of claim 211, further comprising:
said active material (31) external to and in mechanical connection with the energy storage device (10).

256. The device of claim 211, further comprising:
said active material (31) in mechanical connection with at least one terminal of the energy storage device (10).

257. The device of claim 211, further comprising:
said active material (31) comprising magneto-responsive material responsive to magnetic fields; and
said electromagnetic signal comprising a magnetic field; wherein:
said magneto-responsive material introduces said mechanical excitations in response to said magnetic field.

258. The device of claim 257, further comprising:
an electrolyte of the energy storage device (10) comprising said magneto-responsive material.

259. The device of claim 211, further comprising:
said active material (31) comprising electrostrictive material responsive to electrical signals; and
said electromagnetic signal comprising an electrical signal; wherein:
said electrostrictive material introduces said mechanical excitations in response to said electrical signal.

260. The device of claim 211, further comprising:
said active material (31) comprising magnetostrictive material responsive to magnetic fields; and
said electromagnetic signal comprising a magnetic field; wherein:
said magnetostrictive material introduces said mechanical excitations in response to said magnetic field.

261. The device of claim 211, further comprising:
said electromagnetic signal comprising an electrical current comprising non-DC components.

262. The device of claim 261, wherein:
said non-DC components are introduced into the energy storage device (10) by being applied across an electrical potential of the energy storage device (10).

263. The device of claim 261, wherein:
said non-DC components are introduced into the energy storage device (10) via magnetic induction.

264. The device of claim 211, further comprising:
an electric current comprising non-DC components, in addition to said electromagnetic signal, and;
electrical excitations, in addition to said mechanical excitations, introduced into the energy storage device (10) via said non-DC components, at frequencies proximate said resonant frequencies.

265. The device of claim 264, wherein:
said non-DC components are introduced into the energy storage device (10) by being applied across an electrical potential of the energy storage device (10).

266. The device of claim 264, wherein:
said non-DC components are introduced into the energy storage device (10) via magnetic induction.

267. The device of claim 264, said electrical excitations comprising:
electrical oscillations oscillating the chemical reaction products at a predetermined periodic oscillation frequency.

268. The device of claim 264, said electrical excitations comprising:
electrical pulses pulsing the chemical reaction products with a pulse of a predetermined rise time.

269. The device of claim 211, further comprising:
an electric current comprising non-DC components, in addition to said electromagnetic signal; and
electrical excitations, in addition to said mechanical excitations, introduced into the energy storage device (10) via said non-DC components, at at least one frequency higher than said resonant frequencies.

270. The device of claim 269, wherein:
said non-DC components are introduced into the energy storage device (10) by being applied across an electrical potential of the energy storage device (10).

271. The device of claim 269, wherein:
said non-DC components are introduced into the energy storage device (10) via magnetic induction.

272. The device of claim 269, said electrical excitations comprising:
electrical oscillations oscillating the chemical reaction products at a predetermined periodic oscillation frequency.

273. The device of claim 269, said electrical excitations comprising:
electrical pulses pulsing the chemical reaction products with a pulse of a predetermined rise time.

274. The device of claim 264, further comprising:
a control module causing said mechanical excitations to be introduced during at least part of a time while the energy storage device (10) is charged; and
said control module causing said non-DC components to be introduced during at least part of a time while the energy storage device (10) is discharged.

275. The device of claim 265, further comprising:

a control module causing said mechanical excitations to be introduced during at least part of a time while the energy storage device (10) is charged; and said control module causing said non-DC components to be applied across the electrical potential during at least part of a time while the energy storage device (10) is discharged.

276. The device of claim 269, further comprising:

a control module causing said mechanical excitations to be introduced during at least part of a time while the energy storage device (10) is discharged; and said control module causing said non-DC components to be introduced during at least part of a time while the energy storage device (10) is charged.

277. The device of claim 270, further comprising:

a control module causing said mechanical excitations to be introduced during at least part of a time while the energy storage device (10) is discharged; and said control module causing said non-DC components to be applied across the electrical potential during at least part of a time while the energy storage device (10) is charged.

278. The device of claim 211, further comprising:

electrical power from said energy storage device (10) provided to a motor vehicle; and electrical power received into said energy storage device (10) from said motor vehicle.

279. The device of claim 211, further comprising:

a hybridizer causing energy from a supplemental source of energy in addition to energy from said energy storage device (10), in varying proportions responsive to varying operating conditions, to power a load.

280. The device of claim 211, further comprising:

an electrical connection between said energy storage device (10) and a power generation and distribution system enabling said energy storage device (10) to receive electrical power from said power generation and distribution system;

said electrical connection further enabling said energy storage device (10) to supply electrical power into said power generation and distribution system; and a load balancer causing said energy storage device (10) to receive and supply said electrical power from and into said power generation and distribution system, in response to varying operating conditions.

* * * * *